(12) United States Patent
Tung

(10) Patent No.: US 7,738,538 B1
(45) Date of Patent: *Jun. 15, 2010

(54) FLEXIBLE AND IN-BAND SIGNALING FOR NESTED PREAMBLE

(75) Inventor: Chien-Cheng Tung, Fremont, CA (US)

(73) Assignee: Ralink Technology Corporation, Jhubei (TW)

( * ) Notice: Subject to any disclaimer, the term of this patent is extended or adjusted under 35 U.S.C. 154(b) by 895 days.

This patent is subject to a terminal disclaimer.

(21) Appl. No.: 11/496,943

(22) Filed: Jul. 31, 2006

Related U.S. Application Data

(63) Continuation-in-part of application No. 11/475,606, filed on Jun. 26, 2006.

(60) Provisional application No. 60/704,547, filed on Aug. 1, 2005.

(51) Int. Cl.
H04B 1/00 (2006.01)

(52) U.S. Cl. .................. 375/150; 375/267; 375/316; 375/347; 370/477

(58) Field of Classification Search ............... 375/150, 375/267, 316, 347; 370/477
See application file for complete search history.

(56) References Cited

U.S. PATENT DOCUMENTS

| | | | |
|---|---|---|---|
| 7,019,595 B1 | 3/2006 | Lo et al. | |
| 7,197,094 B2 | 3/2007 | Tung | |
| 7,245,677 B1 | 7/2007 | Pare, Jr. | |
| 7,248,650 B1 | 7/2007 | Tung et al. | |
| 7,266,146 B2 | 9/2007 | Pare, Jr. et al. | |
| 2005/0180361 A1* | 8/2005 | Hansen et al. | 370/334 |
| 2005/0286562 A1* | 12/2005 | Nakao et al. | 370/477 |

* cited by examiner

*Primary Examiner*—Ted M Wang
(74) *Attorney, Agent, or Firm*—Maryam Imam; IPxLaw Group LLP

(57) ABSTRACT

A multi input multi output (MIMO) receiver is disclosed for transmitting and receiving packets having a preamble format of a packet of information and having a short training sequence (STS), a long training sequence (LTS) and signal (SIG) for training receivers, in accordance with an embodiment of the present invention. The packets having a preamble format for allowing data to be piggy-backed, e.g. transmitted and received using the physical layer rather than the transport layer of networking layers.

5 Claims, 23 Drawing Sheets

Figure 110—BPSK, QPSK, 16-QAM, and 64-QAM constellation bit encoding

| 1520 | | |
|---|---|---|
| STS-N 8 us | LTS 8 us | SIG-N 8 us |

| | | |
|---|---|---|
| STS-N | LTS20 | SIG-N20 |
| STS-N' | LTS21 | SIG-N21 |

| | | |
|---|---|---|
| STS-N | LTS30 | SIG-N30 |
| STS-N' | LTS31 | SIG-N31 |
| STS-N'' | LTS32 | SIG-N32 |

| | | | | |
|---|---|---|---|---|
| STS-N | LTS40 | SIG-N40 | LTS41 | LTS43 |
| STS-N' | LTS41 | SIG-N41 | LTS42 | LTS42 |
| STS-N'' | LTS42 | SIG-N42 | LTS43 | LTS40 |
| STS-N''' | LTS43 | SIG-N43 | LTS40 | LTS41 |

| STS-A 8 us | LTS 8 us | SIG-A 4 us | SIG-N 4 us |       |       |       |       |       |       |       |       |       |       |
|---|---|---|---|---|---|---|---|---|---|---|---|---|---|
| STS-A  | LTS20 | SIG-A20 | SIG-N20 | LTS10 |       |       |       |       |       |       |       |       |       |
| STS-A' | LTS21 | SIG-A21 | SIG-N21 | LTS11 |       |       |       |       |       |       |       |       |       |
| STS-A  | LTS30 | SIG-A30 | SIG-N30 | LTS31 | LTS32 |       |       |       |       |       |       |       |       |
| STS-A' | LTS31 | SIG-A31 | SIG-N31 | LTS32 | LTS30 |       |       |       |       |       |       |       |       |
| STS-A" | LTS32 | SIG-A32 | SIG-N32 | LTS30 | LTS31 |       |       |       |       |       |       |       |       |
| STS-A   | LTS40 | SIG-A40 | SIG-N40 | LTS41 | LTS42 | LTS43 |       |       |       |       |       |       |       |
| STS-A'  | LTS41 | SIG-A41 | SIG-N41 | LTS42 | LTS43 | LTS40 |       |       |       |       |       |       |       |
| STS-A"  | LTS42 | SIG-A42 | SIG-N42 | LTS43 | LTS40 | LTS41 |       |       |       |       |       |       |       |
| STS-A''' | LTS43 | SIG-A43 | SIG-N43 | LTS40 | LTS41 | LTS42 |       |       |       |       |       |       |       |

| STS-A | LTS20 | SIG-A20 | SIG-N20 | STS-A | LTS |
|---|---|---|---|---|---|
| STS-A' | LTS21 | SIG-A21 | SIG-N21 | | |

| STS-A | LTS30 | SIG-A30 | SIG-N30 | STS-A | LTS20 | LTS21 |
|---|---|---|---|---|---|---|
| STS-A' | LTS31 | SIG-A31 | SIG-N31 | STS-A' | LTS21 | LTS20 |
| STS-A'' | LTS32 | SIG-A32 | SIG-N32 | | | |

| STS-A | LTS40 | SIG-A40 | SIG-N40 | STS-A | LTS30 | LTS31 | LTS32 |
|---|---|---|---|---|---|---|---|
| STS-A' | LTS41 | SIG-A41 | SIG-N41 | STS-A' | LTS31 | LTS32 | LTS30 |
| STS-A'' | LTS42 | SIG-A42 | SIG-N42 | STS-A'' | LTS32 | LTS30 | LTS31 |
| STS-A''' | LTS43 | SIG-A43 | SIG-N43 | | | | |

FIG. 22

Table 1

| SCM (MSB,LSB) | 64 QAM | | 16 QAM | | QPSK | | BPSK | |
|---|---|---|---|---|---|---|---|---|
| | MOD. | Reduced Bits | MOD. | Reduced Bits | MOD. | Reduced Bits | MOD. | Reduced Bits |
| 00 | 64QAM | 0 | 16QAM | 0 | QPSK | 0 | BPSK | 0 |
| 01 | 16QAM | 2 | QPSK | 2 | BPSK | 1 | NULL | 1 |
| 10 | QPSK | 4 | BPSK | 3 | NULL | 2 | NULL | 1 |
| 11 | BPSK | 5 | NULL | 4 | NULL | 2 | NULL | 1 |

Frequently Used Parameters

Table 2

| Symbol | Explanation |
|---|---|
| $N_{DSC}$ | Number of data sub-carriers |
| $N_{DATA}$ | Number of symbols in data field |
| $N_{IBS}$ | Number of in-band signal data byte |
| $N_{CBPSS\_X}$ | Number of coded bits per symbol per spatial stream, $X = 0..N_{SS}-1$ |
| $N_{DBPS\_AM}$ | Number of data bits per symbol with adaptive modulation |
| $N_{BPSC\_Y}$ | Number of coded bits per single carrier, $Y = 0..N_{DSC}-1$ |
| $N_{RBPSC\_Y}$ | Number of removed coded bits per single carrier |
| $N_{RBPS}$ | Number of removed coded bits per symbol |

| Data Rate (Mbps) | Bits per Symbol | Number of Symbols for SIG-N | Remaining Bits with 40 bits SIG-N |
|---|---|---|---|
| 6 | 24 | 2 | 4 |
| 9 | 36 | 2 | 32 |
| 12 | 48 | 1 | 8 |
| 18 | 72 | 1 | 32 |
| 24 | 96 | 1 | 56 |
| 36 | 144 | 1 | 104 |
| 48 | 192 | 1 | 152 |
| 54 | 216 | 1 | 176 |

TABLE 3

FLEXIBLE AND IN-BAND SIGNALING FOR NESTED PREAMBLE

REFERENCE TO PRIOR APPLICATION

This application claims the benefit of a previously filed U.S. Provisional Application No. 60/704,547 filed on Aug. 1, 2005, and entitled "Flexible and In-band Signaling for Nested Preamble" and is a continuation-in-part of a prior U.S. patent application Ser. No. 11/475,606, entitled "Nested Preamble For Multi Input Multi Output Orthogonal Frequency Division Multiplexing", filed on Jun. 26, 2006, the disclosures of which are incorporated herein as though set forth in full.

BACKGROUND OF THE INVENTION

1. Field of the Invention

The present invention relates generally to the field of preamble formats for multi, input multi output (MIMO) systems and particularly to a method and apparatus for merging the benefit of the Greenfield preamble format into a mixed mode preamble format with forward/backward compatibility of 802.11a, 802.11g and 802.11n standards.

2. Description of the Prior Art

Wireless Local Area Network (WLAN) is popular technology for home, office and public wireless access of the Internet. The WLAN industry has become so successful that new applications rapidly continue to evolve. Example applications like handset, Personal Digital Assistant (PDA), medium adaptor, and video streaming. The expanding demand returns to drive the further progress of WLAN industry. IEEE 802.11n, a standard adopted by the industry, sets forth new WLAN standards to respond to this need.

Multiple-input-multiple-output (MIMO) is prevalently employed in communication equipment and devices. MIMO-OFDM (Orthogonal Frequency Division Modulation) is becoming the modulation scheme of the new high speed WLAN standard, the IEEE 802.11n. MIMO-OFDM systems include multiple transmitters and receivers for transmitting and receiving streams of data using OFDM. MIMO-OFDM systems can be denoted as nTmSrR, where 'n' is the number of transmitter antennas, 'm' is the number of data streams and 'r' is the number of receiver antennas. The new WLAN standard is expected to support high throughput and extended range through MIMO-OFDM.

WLAN is based on medium sharing technology, which is packet-based instead of using direct link. Packets provide excellent framework for sharing. For every transmitted packet, there is a preamble associated therewith. A preamble is used to train and initialize receivers before sending data that follows the preamble. To achieve high throughput, the overhead associated with the preamble length is critical for high PHY rate. Efficiency becomes one important criterion for preamble design.

Given the broad scope of the new WLAN standard, many MIMO-OFDM schemes need to work under the same framework, therefore besides efficiency, interoperability with legacy WLAN devices and forward/backward compatibility within 802.11n modes become another challenge for preamble design.

Previous works on MIMO preamble are showed in proposals from 80211.n standard subgroups, such as WWiSE and TGnSync group. The major drawback of TGnSync preamble design is lack of efficiency, which impacts throughput especially when a packet length is short. The shortcomings of WWiSE preamble design are lack of flexibility to accommodate different features, such as transmit beamforming, in addition to less well thought on interoperability issue between supported 11n modes.

In light of the foregoing, what is needed is a framework combining the strength of both WWiSE and TGnSync preambles.

SUMMARY OF THE INVENTION

Briefly, an embodiment of the present invention includes a multi input multi output (MIMO) receiver for receiving packets having a preamble format of a packet of information, the format including a short training sequence (STS), a long training sequence (LTS) and signal (SIG) for training receivers. The preamble format for allowing data to be piggybacked, e.g. transmitted and received using the physical layer rather than the transport layer of networking layers.

The foregoing and other objects, features and advantages of the present invention will be apparent from the following detailed description of the preferred embodiments which make reference to several figures of the drawing.

IN THE DRAWINGS

FIG. 11 shows two data streams in the 20 Mega Hertz (MHz) band, in accordance with an embodiment of the present invention.

FIG. 20 shows nested Greenfield preamble formats for one to four streams cases.

FIG. 21 shows nested preamble formats that combines Greenfield and mixed mode for one to four streams cases.

FIG. 22 shows nested preamble formats for transmit beam forming for one to three streams cases.

Table 1 shows the 2-bit groups corresponding to each of the 4 modulation modes used in adaptive modulation, in accordance with an embodiment of the present invention.

Table 2 shows a list of the frequently used parameters in adaptive modulation, in accordance with an embodiment of the present invention.

Table 3 shows the capacity table of all possible modulation modes for flexible SIG-N.

DETAILED DESCRIPTION OF THE PREFERRED EMBODIMENTS

Figure 1:
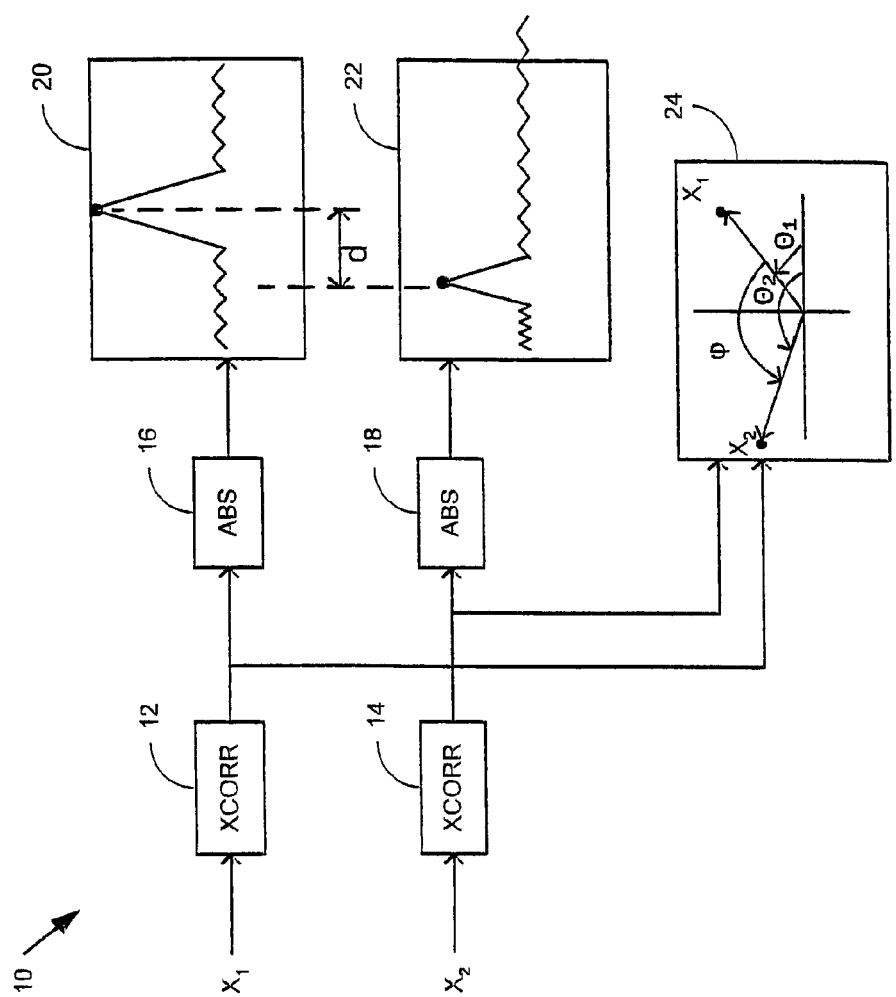
FIG. 1 shows a functional block diagram of a joint time/frequency domain maximum ratio combining (MRC) multi input multi output (MIMO) receiver, in accordance with an embodiment of the present invention.

Referring now to FIG. 1, a functional block diagram of a joint time/frequency domain maximum ratio combining (MRC) multi input multi output (MIMO) receiver 10 is shown to include a first cross-correlator 12, a second cross correlator 14, a first absolute value (ABS) module 16, a second ABS module 18, two magnitude indicator modules 20 and 22, and a phase indicator module 24.

The cross correlator 12 is coupled to the ABS module 16 and the phase indicator module 24 while the cross correlator 14 is coupled to the ABS module 18 and the phase indicator module 24. The ABS module 16 is coupled to the magnitude indicator module 20 while the ABS module 18 is coupled to the magnitude indicator module 22.

The MIMO receiver 10 is a 1 transmitter 2 receiver (1T2R) system wherein a signal is transmitted and is received by two antennae. High data rate wireless receivers often employ multiple antennae to improve reception of the incoming signals by optimizing the signal to noise ratio (SNR). For the MIMO receiver 10 the two received baseband signals are $X_1$ and $X_2$ which are processed by the cross correlators 12 and 14, respectively.

Conventional 802.11g compliant receivers decode data modulated in both the time domain, complementary code keying (CCK), and the frequency domain, orthogonal frequency division multiplexing (OFDM). The cross correlators 12 and 14 determine whether the received baseband signals $X_1$ and $X_2$ are of the CCK or OFDM type. Subsequently, the 2 received baseband signals are aligned in the time domain by first determining the absolute value or magnitude of the received baseband signal $X_1$, represented by a complex scalar, in the ABS module 16. The magnitude of $X_1$ is shown plotted as a function of time in the magnitude indicator module 20. Similarly, the absolute value of the complex-valued received baseband signal $X_2$ is determined in the ABS module 18 which is shown plotted as a function of time in the magnitude indicator module 22.

The time offset d between peak locations of the magnitudes of $X_1$ and $X_2$ shown in the magnitude indicator modules 20 and 22 is computed. For time alignment, the time offset d is corrected by advancing or delaying, i.e. translating, one received baseband signal with respect to the other. Thus, the CCK and OFDM modulated signals, included within the received baseband signals, are time aligned in the time domain.

The phase offset between the two CCK modulated signals is corrected by computing the angle $\phi$ therebetween and applying the negative of $\phi$ to one of the signals. Specifically, if a CCK modulated signal $X_1$ with the largest magnitude $R_1$ is denoted by $R_1\exp(j\theta_1)$ and a CCK modulated signal $X_2$ with the largest magnitude $R_2$ is denoted by $R_2\exp(j\theta_2)$, then $\phi$ is computed according to $$\phi=\mathrm{angle}(X_2X_1^*)=\theta_2-\theta_1,$$

where the asterisk represents complex conjugation. Phase adjustment of the OFDM modulated signals is performed in the frequency domain on a subcarrier by subcarrier basis, as discussed in detail hereinbelow.

Figure 2:
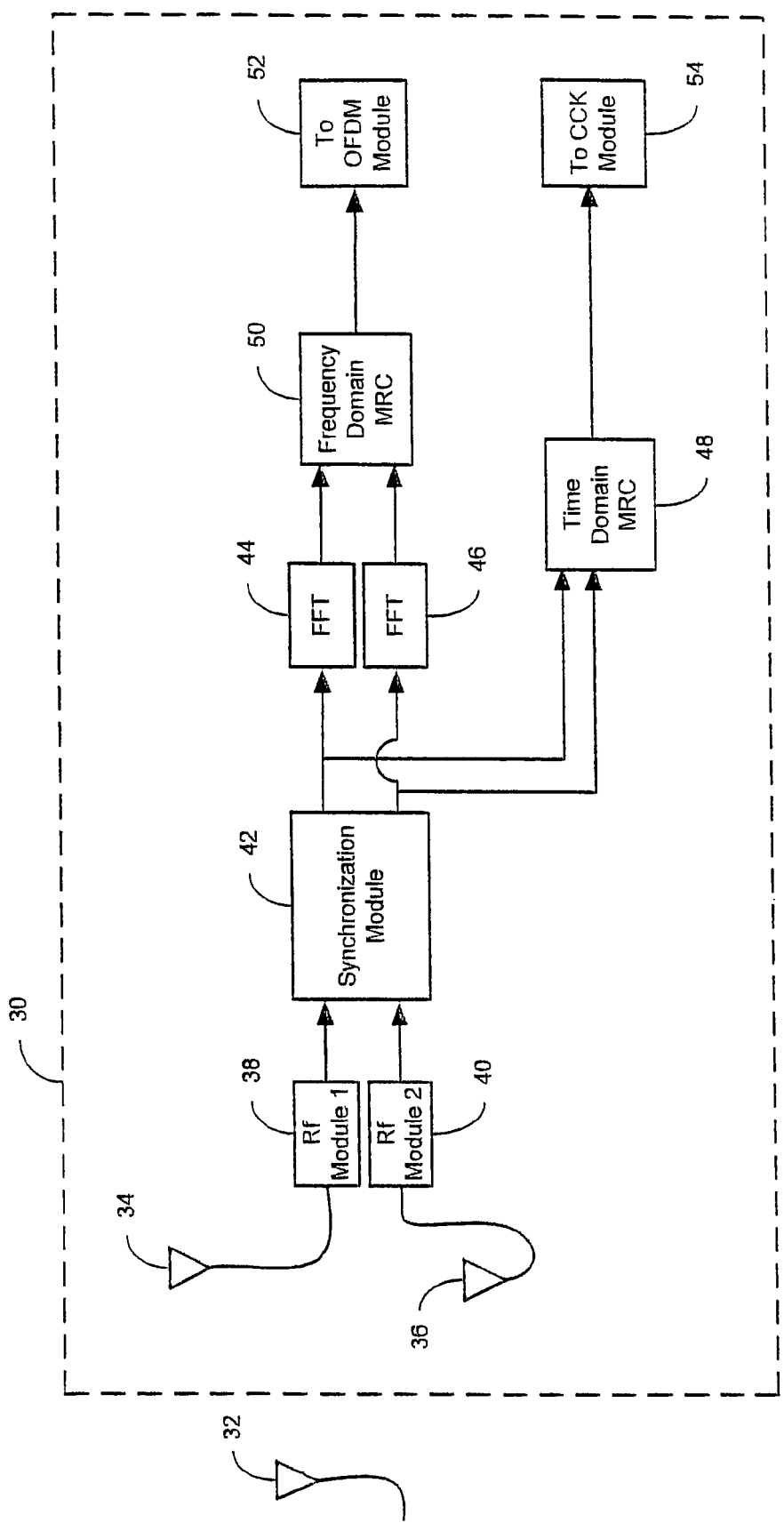
FIG. 2 shows a joint time/frequency domain MRC architecture for a MIMO receiver, in accordance with an embodiment of the present invention.

Referring now to FIG. 2, a joint time/frequency domain MRC architecture for an MIMO receiver 30 is shown, in accordance with an embodiment of the present invention. Also shown in FIG. 2 is a transmitter antenna 32 for transmitting signals to the receiver 30. The MIMO receiver 30 includes two receiving antennae 34 and 36, two radio frequency (RF) modules 38 and 40, a synchronization (SYNC) module 42, two fast Fourier transform (FFT) modules 44 and 46, a frequency domain OFDM MRC module 50, an OFDM module 52, a time domain CCK MRC module 48, and a CCK module 54.

The receiving antennae 34 and 36 are coupled to the RF modules 38 and 40, respectively, which are coupled to the SYNC module 42. The SYNC module 42 is coupled to the two FFT modules 44 and 46 and the time domain CCK MRC module 48 which is coupled to the CCK module 54. The FFT modules 44 and 46 are coupled to the frequency domain OFDM MRC module 50 which is coupled to the OFDM module 52.

The signal transmitted by the antenna 32 is received by the receiving antennae 34 and 36, each of which processes a received signal. The RF modules 38 and 40 convert the received signals to received baseband signals which are transferred to the SYNC module 42. The SYNC module 42 aligns the OFDM modulated signals, included in the received baseband signals, in time domain to generate two aligned OFDM signals. The SYNC module 42 also computes the MRC parameters for the time domain CCK modulated signals included in the received baseband signals. Accordingly, the SYNC module 42 controls the MRC processing for both time domain and frequency domain data paths.

Specifically, the SYNC module 42 computes the MRC parameters for the CCK modulated signals including the time offset d between peak locations of the signals. Also computed is the phase offset $\phi$ for phase adjustment of the CCK modulated signals as described hereinabove. The MRC parameters are transferred to the time domain CCK MRC module 48. The SYNC module 42 also uses the time offset d to align the two OFDM modulated signals in time domain to generate two aligned OFDM signals which are transferred to the FFT modules 44 and 46.

The MIMO receiver 30 performs phase adjustment of the OFDM modulated signals in the frequency domain as part of the equalization process. This is because OFDM modulation is inherently broadband and channel conditions may vary across the spectrum. Thus, it is advantageous to combine the OFDM modulated signals on the basis of each subcarrier using varying MRC parameters optimized for each subcarrier. Such an approach allows the MIMO receiver 30 to naturally select the best channel conditions among the received baseband signals. Accordingly, combining of the OFDM modulated signals is performed in the frequency domain as described hereinbelow.

The IEEE 802.11g standard requires capabilities to process both CCK and OFDM modulated signals. In the embodiment of the present invention shown in FIG. 2, in order to apply the benefits of MRC signal combining for 802.11g receivers with multiple antennae, both time and frequency domain combining are performed. In this way, the joint time/frequency domain MRC architecture for the MIMO receiver 30 nearly optimizes the performance of a multi-antennae receiver. Although the embodiment of the present invention shown in FIG. 2 is for a 1-transmitter 2-receiver (1T2R) system, in alternative embodiments of the present invention there are more than 1 transmitter and 2 receivers.

The time domain CCK MRC module 48 applies the time offset and the phase offset to the CCK modulated signals in time domain to generate aligned signals. The aligned signals are combined to generate an adjusted signal which is transferred to the CCK module 54 for demodulation.

The FFT modules 44 and 46 perform 64-point FFT converting the 64 time domain samples in each of the two aligned OFDM signals into 64 frequency domain subcarriers which comprise one data symbol. Both sets of subcarriers are transferred to the frequency domain OFDM MRC module 48. The frequency domain OFDM MRC module 48 performs phase adjustment in the frequency domain as part of the equalization process to combine the subcarriers.

Specifically, for the MIMO receiver 30, with two received signals, there are two channel estimates for each subcarrier, that is $$H_i = [h^1 h^2]_i^T,$$

where T stands for the transpose of the 1×2 matrix and the subscript i stands for the $i^{th}$ subcarrier. The corresponding equalizer coefficient is $$F_i = H_i^*/|H_i|^2 = (|h^1|^2 + |h^2|^2)^{-1} [h^{1*} h^{2*}] = [Z^1 Z^2].$$

If the $i^{th}$ subcarrier of the two signals are denoted by $y^1$ and $y^2$ then the equalized response for the $i^{th}$ subcarrier is $$F_i [y^1 y^2]_i^T = (Z^1 y^1 + Z^2 y^2)_i$$

where i=1, . . . , 52 for each of the subcarriers. Thus, if a signal is deeply faded the effect thereof on the equalized response is de-emphasized and vice versa, i.e., channel information is being used in the MRC processing of the OFDM modulated signals. It is also noted that an efficient method to weight the Vitebri metrics for data decoding is discussed in the U.S. patent application Ser. No. 10/782,351 filed on Feb. 18, 2004 and referred to hereinabove. The Vitebri weighting method may be extended to the MIMO receiver 30 by simply using the sum of the magnitudes, i.e., $(|h^1|^2 + |h^2|^2)_i$, i=1, . . . , 52.

The frequency domain OFDM MRC module 50 generates an equalized response that is transferred to the OFDM module 52 for demodulation.

The MIMO receiver 30, shown in FIG. 2, includes a processor (not shown), or computer medium, some type of storage area and a computer readable medium, for storing the software/firmware described in FIG. 2. The processor executes codes from the computer readable medium for effectuating the functions outlined in FIG. 2.

Figure 3:
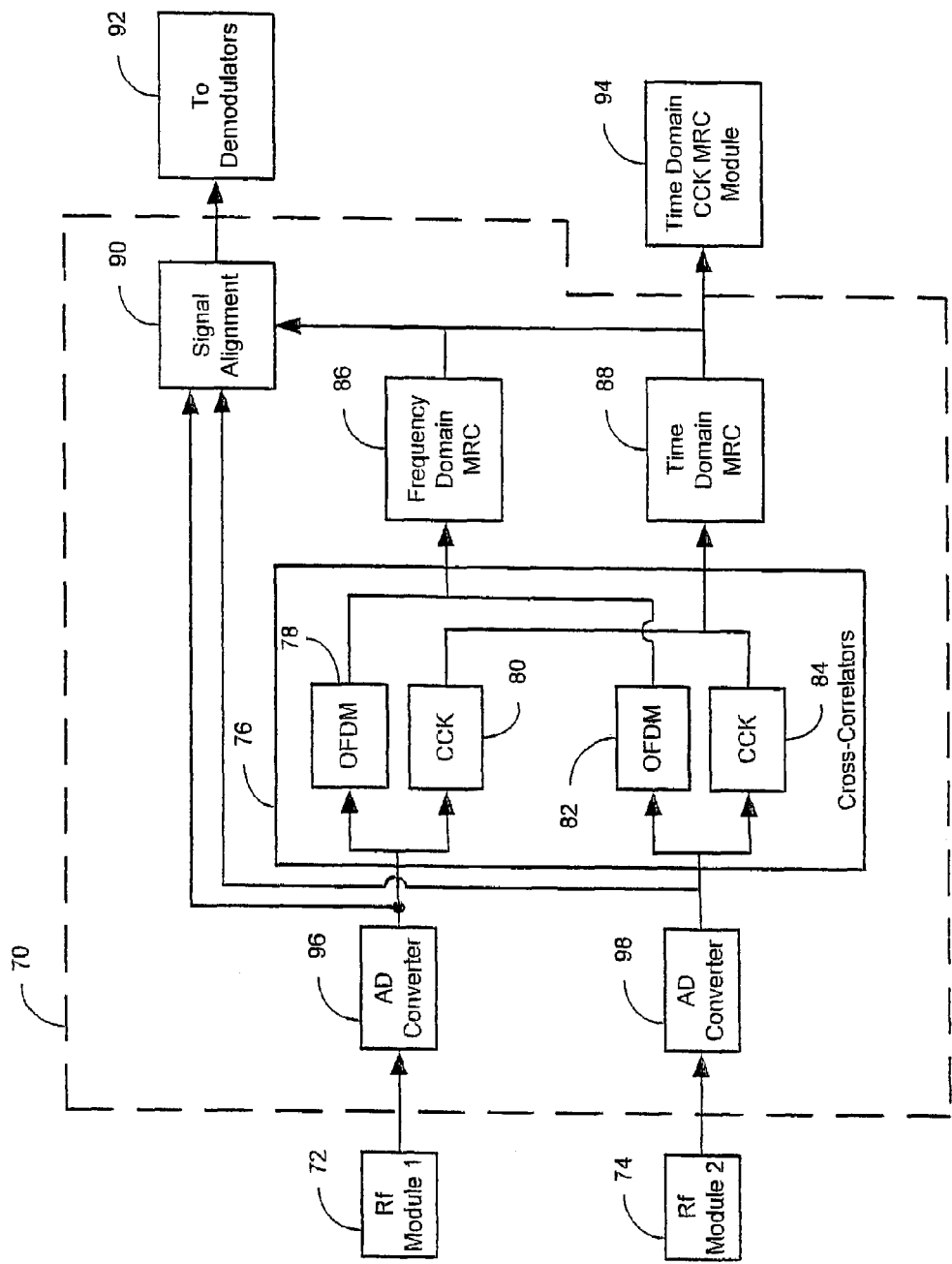
FIG. 3 shows a synchronization (SYNC) module, in accordance with an embodiment of the present invention.

Referring now to FIG. 3, a SYNC module 70 is shown to include two cross correlators 76, a frequency domain MRC module 86, a time domain MRC module 88, a signal alignment module 90, and two analog to digital (AD) converters 96 and 98, in accordance with an embodiment of the present invention. Also shown in FIG. 3 are two RF modules 72 and 74, a demodulator 92, and a time domain CCK MRC module 94.

The RF modules 72 and 74 are coupled to the AD converters 96 and 98, respectively which are coupled to the cross correlators 76 and the signal alignment module 90. Specifically, the AD converter 96 is coupled to the OFDM module 78 and the CCK module 80 while the AD converter 98 is coupled to the OFDM module 82 and the CCK module 84. The OFDM modules 78 and 82 are coupled to the frequency domain MRC module 86 and the CCK modules 80 and 84 are coupled to the time domain CCK module 88 which is coupled to the signal alignment module 90 and the time domain CCK MRC module 94. The frequency domain MRC module 86 is coupled to the signal alignment module 90 which is coupled to the demodulator 92.

The received baseband signals are the input to the AD converters 96 and 98 where the signals are converted to two digital input signals. The cross correlators 76 distinguish between the CCK and OFDM modulated signals so that OFDM modulated signals are received by the OFDM modules 78 and 82 while the CCK modulated signals are received by the CCK modules 80 and 84. The outputs of the CCK modules 80 and 84 are transferred to the time domain MRC module 88 and the outputs of the OFDM modules 78 and 82 are transferred to the frequency domain MRC module 86.

The time domain MRC module 88 computes the time offset d and the phase angle φ which are transferred to the time domain CCK MRC module 94. The time offset and the output of the frequency domain MRC module 86 and the output of the frequency domain MRC module 86 are transferred to the signal alignment module 90. The signal alignment module 90 also receives the digital input signals wherein the time offset is used to align the OFDM modulated signals as described hereinabove. The signal alignment module 90 generates aligned OFDM signals that are transferred to the demodulator 92 for demodulation.

Another function of the time domain MRC module 88 is gain scaling based on the independent automatic gain control (AGC) settings of the analog RF amplifiers. That is, each of the RF modules 72 and 74 has an independent AGC setting denoted by $G_1$ and $G_2$, respectively, unlike some receivers where only a single AGC setting is used for all the receivers. Independent AGC settings enable the MIMO receiver 30 to use better quality channel information when available by allowing each receiver to use the full dynamic range of the AD converters.

For gain scaling two MRC weights $W_1$ and $W_2$ based on $G_1$ and $G_2$ are computed according to $$W_1 = G_2/(G_1 + G_2),$$

$$W_2 = G_1/(G_1 + G_2).$$

Through the MRC weights, channel quality information may be used. For example, if channel 2 is severely faded indicating the data on channel 2 to be less reliable then the gain $G_2$ will need to be large. In such a case, the above relations indicate that the channel 1 MRC weight $W_1$ is relatively large for the better quality channel. The quantity $(G_1+G_2)$ serves to normalize the gains analogous to the quantity $(|h^1|^2+|h^2|^2)$ used for the MRC equalizer coefficients. The division by $(G_1+G_2)$ may be avoided by using a look-up table based on the known AGC settings. In other embodiments of the present invention weights similar to MRC weights are applied to the OFDM modulated signal to further optimize the performance of the MIMO receiver. The MRC weights are transferred to the time domain CCK MRC module 94.

Figure 4:
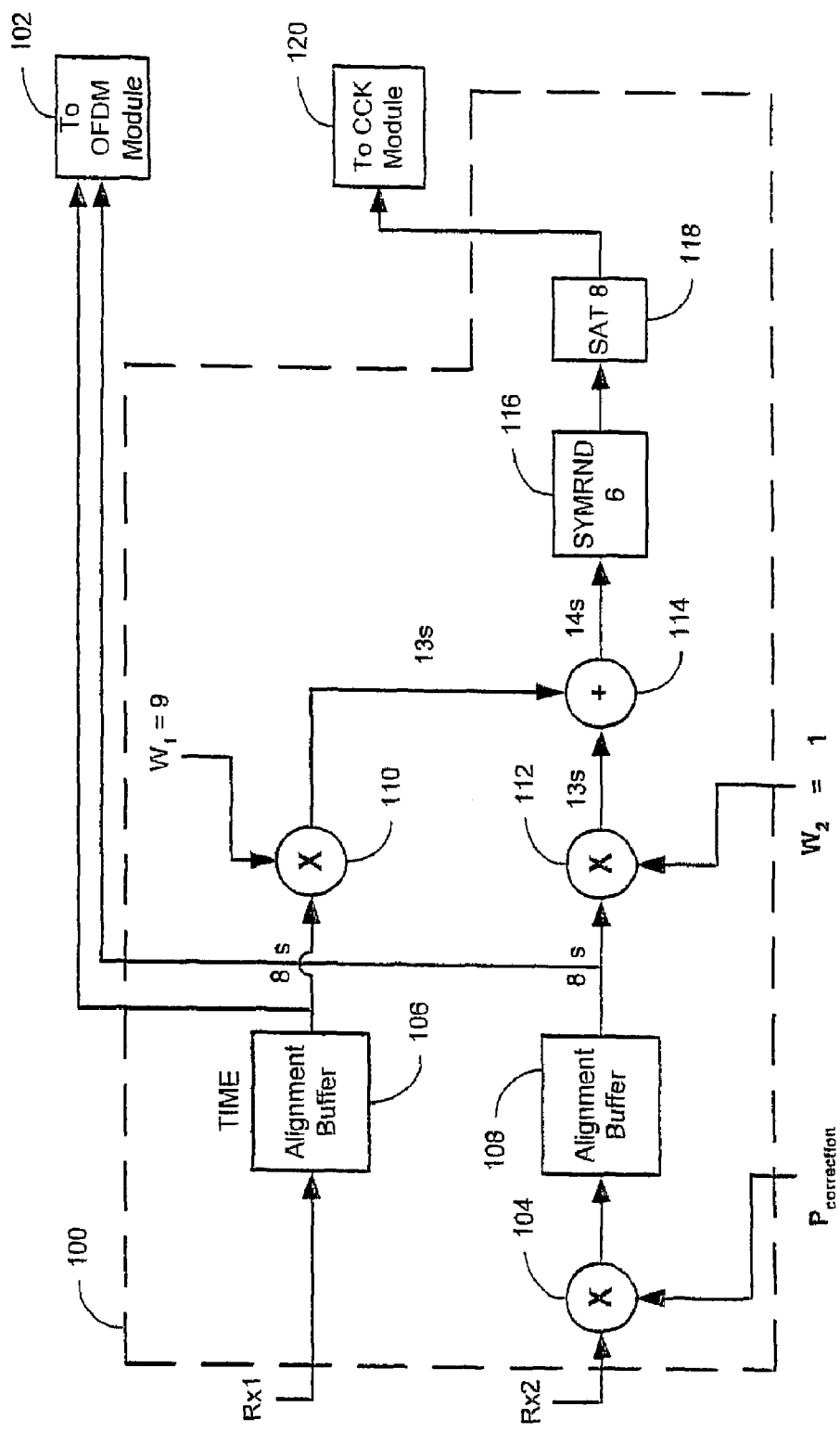
FIG. 4 shows a time domain complementary code keying (CCK) MRC module, in accordance with an embodiment of the present invention.

Referring now to FIG. 4, a time domain CCK MRC module 100 is shown to include a multiplier 104, two alignment buffers 106 and 108, two multipliers 110 and 112, a summation junction 114, a division module 116, and a saturation module 118, in accordance with an embodiment of the present invention. Also shown in FIG. 4 is an OFDM module 102 and a CCK module 120.

The multiplier 104 is coupled to the alignment buffer 108 which is coupled to the multiplier 112 and the OFDM module 102. The alignment buffer 106 is coupled to the multiplier 110 and the OFDM module 102. The multipliers 110 and 112 are coupled to the summation junction 114 which is coupled to the division module 116. The division module 116 is coupled to the saturation module 118 which is coupled to the CCK module 120.

The multiplier 104 receives a second CCK modulated signal which is phase corrected at the multiplier 104 using the phase offset cp. The phase corrected signal is transferred to the alignment buffer 108. A first CCK modulated signal is received by the alignment buffer 106 to be time aligned. The outputs of the alignment buffers 106 and 108 are first and second aligned signals that are transferred to the OFDM module 102 for demodulation and to the two multipliers 110 and 112, respectively.

The first aligned signal is multiplied by $W_1$ at the multiplier 110 and the second aligned signal is multiplied by $W_2$ at the multiplier 112 to generate two scaled outputs which are added at the summation junction 114 to generate an adjusted signal. The adjusted signal is divided by 2 (shift right) at the division module 116 and subsequently saturated to 8 bits at the saturation module 118. The 8-bit output of the saturation module 118 is transferred to the CCK module 120 for demodulation.

Figure 5:
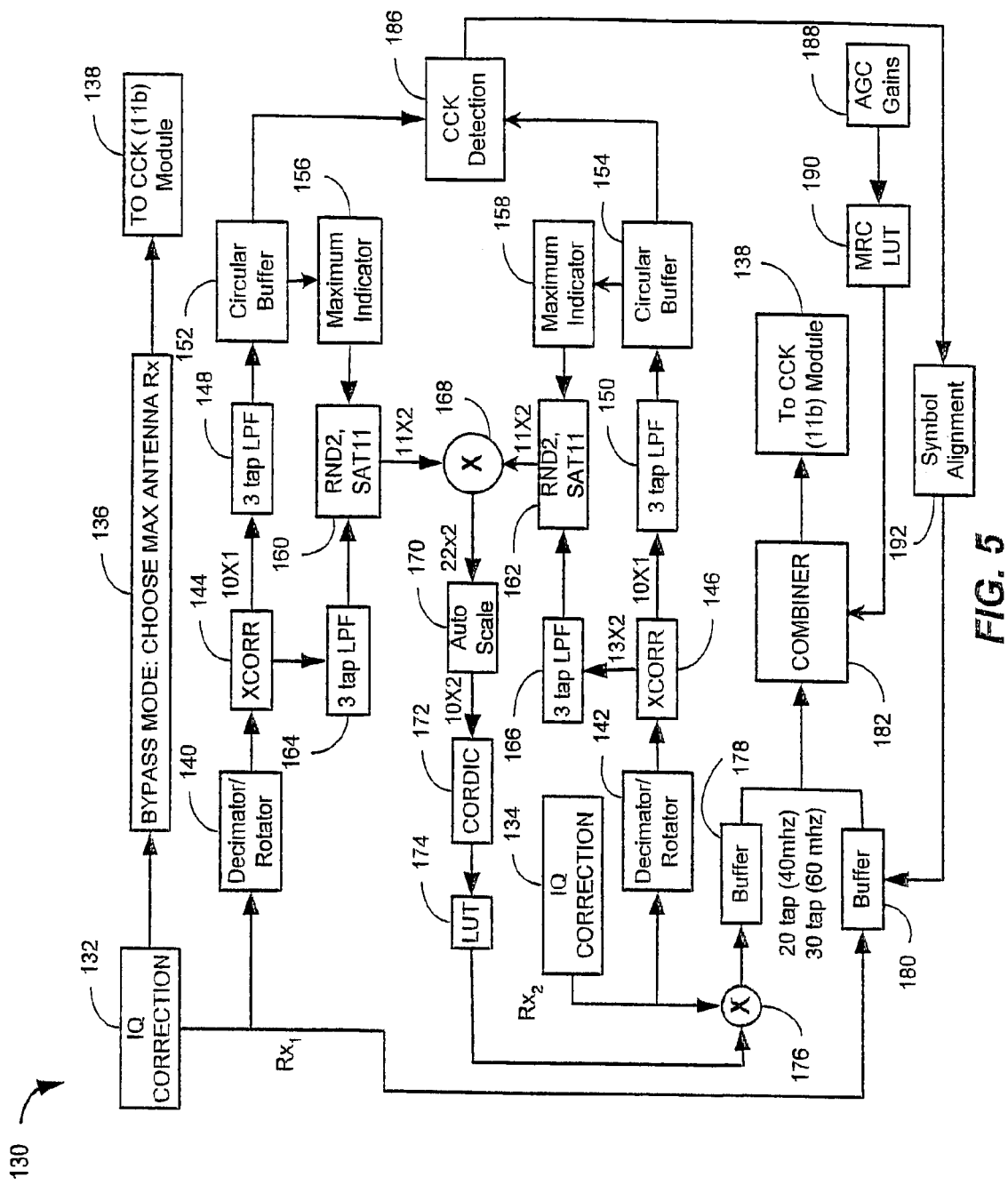
FIG. 5 shows a functional block diagram of the SYNC module and the time domain CCK MRC module, in accordance with an embodiment of the present invention.

Referring now to FIG. 5, a functional block diagram 130 of the SYNC module and the time domain CCK MRC module for processing the CCK modulated signals is shown to include two in-phase and quadrature (IQ) correction modules 132 and 134, two rotator modules 140 and 142, two cross correlators 144 and 146, four low pass filters (LPF) 148, 150, 164, and 166, two circular buffers 152 and 154, two maximum indicators 156 and 158, two saturation modules 160 and 162, two multipliers 168 and 176, an auto scale module 170, a Coordinate Rotation Digital Computer (CORDIC) 172, a look-up table (LUT) module 174, two buffers 178 and 180, a combiner 182, a CCK module 138, a CCK detection module 186, an AGC gains module 188, an MRC LUT module 190, a symbol alignment module 192, and a maximum antenna module 136, in accordance with an embodiment of the present invention.

The IQ module 132 is coupled to the rotator module 140 and the buffer 180 which is coupled to the combiner 182 which is coupled to the CCK module 138. The IQ correction module 134 is coupled to the rotator module 142 and the multiplier 176 which is coupled to the buffer 178 which is coupled to the combiner 182. The IQ correction module 132 is also coupled to the maximum antenna module 136 which is coupled to the CCK module 138.

The rotator module 140 is coupled to the cross correlator 144 which is coupled to the LPF's 148 and 164. The LPF 148 is coupled to the circular buffer 152 which is coupled to the CCK detection module 186 and the maximum indicator 156 which is coupled to the saturation module 160 which is coupled to the multiplier 168. The LPF 164 is coupled to the saturation module 160.

The rotator module 142 is coupled to the cross correlator 146 which is coupled to the LPF's 150 and 166. The LPF 150 is coupled to the circular buffer 154 which is coupled to the CCK detection module 186 and the maximum indicator 158 which is coupled to the saturation module 162 which is coupled to the multiplier 168. The multiplier 168 is coupled to the auto scale module 170 which is coupled to the CORDIC 172 which is coupled to the look-up table module 174 which is coupled to the multiplier 176. The CCK detection module 186 is coupled to the signal alignment module 192 which is coupled to the buffer 180. The AGC gains module 186 is coupled to the MRC LUT module 190 which is coupled to the combiner 182.

Under some circumstances, such as debugging, processing in the time domain may be totally bypassed. That is, by setting control register settings the CCK modulated signal corresponding to the maximum antenna, as determined by the maximum antenna module 136, is sent directly to the CCK module 138 without performing any adjustment in time domain.

Time adjustment of the CCK modulated signals is accomplished using the contents of the circular buffers 152 and 154. Specifically, the two CCK modulated signals, transferred to the rotator modules 140 and 142 are aligned using the peak locations of the signals in the circular buffers 152 and 154. The relative peak locations are retrieved if CCK modulation is detected in the CCK detection module 186. Upon detecting CCK modulation the two CCK modulated signals are time aligned in the signal alignment module 192 using the buffer 180 therefrom the aligned signals are transferred to the combiner 182 for gain scaling as discussed hereinabove. Time alignment is performed after the two CCK modulated signals have been phase adjusted.

After time alignment and phase adjustment, gain scaling is performed on the two aligned signals using the MRC weights generated by the AGC gains module 188 and the MRC LUT module 190. The MRC weights are applied to the aligned signals in the combiner 182.

Phase adjustment of the CCK modulated signals is performed by rotating the second CCK modulated signal, $R_{x2}$ in FIG. 5, so that the phase thereof is essentially equal to the phase of the first CCK modulated signal $R_{x1}$. Phase rotation is computed using the complex output of the cross correlators 144 and 146 corresponding to the peak locations detected in the circular buffers 152 and 154, respectively. When the peak locations are detected in the circular buffers 152 and 154, the corresponding complex values that are the outputs of the LPF's 148 and 150, respectively, are latched. Accordingly, two latched values are generated at the maximum indicator modules 156 and 158. The IQ correction modules 132 and 134 correct gain, orthogonality and delay offset between the in-phase and quadrature components of the complex signals.

At the completion of two complete 11-bit preamble symbols, the two latched values are rounded and saturated at the saturation modules 160 and 162 and multiplied together at the multiplier 168. Multiplication is performed using the conjugate of $R_{x1}$ as discussed hereinabove. The output of the multiplier 168 is auto scaled at the auto scale module 170 to 10 bits to generate an auto-scaled output. The auto-scaled output is processed by the CORDIC 172 to generate a CORDIC output which is used by the look-up table module 174 to look-up the 10-bit phase offset. The phase offset is multiplied by $R_{x2}$ at the multiplier 176 to generate a phase-adjusted signal which is transferred to the buffer 178.

Figure 6:
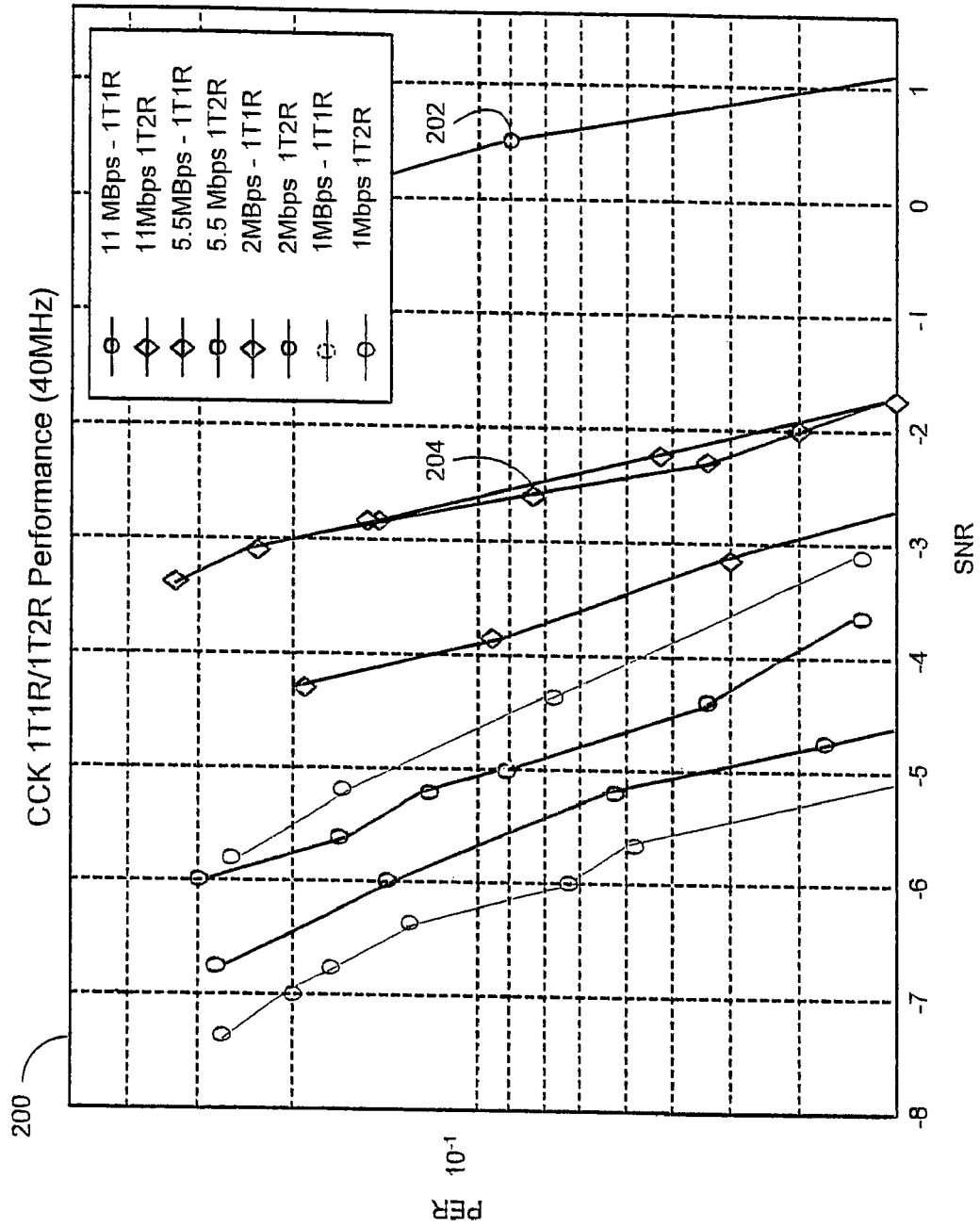
FIG. 6 shows a CCK performance graph for a one-transmitter two-receiver (1T2R) system, in accordance with an embodiment of the present invention.

Referring now to FIG. 6, a CCK performance graph 200 for a 1T2R system is shown, in accordance with an embodiment of the present invention. The graph 200 has signal to noise ratio (SNR) on the horizontal axis in decibels (dB) and packet error rate (PER) on the vertical axis. The graph is generated using a 40 MHz simulator. The performance improvement for the 1T2R CCK MRC receiver over the conventional one transmitter one receiver (1T1R) system under additive white Gaussian noise (AWGN) condition is particularly significant for higher data rates. For example, in the case of 11 megabits per second (MBps) the difference between the points 202 and 204 is approximately 3.1 dB. A summary of results for a plurality of data rates is as follows:

11 MBps 3.1 dB 5.5 MBps 2.4 dB 2.0 MBps 1.6 dB 1.0 MBps 1.5 dB

Figure 7:
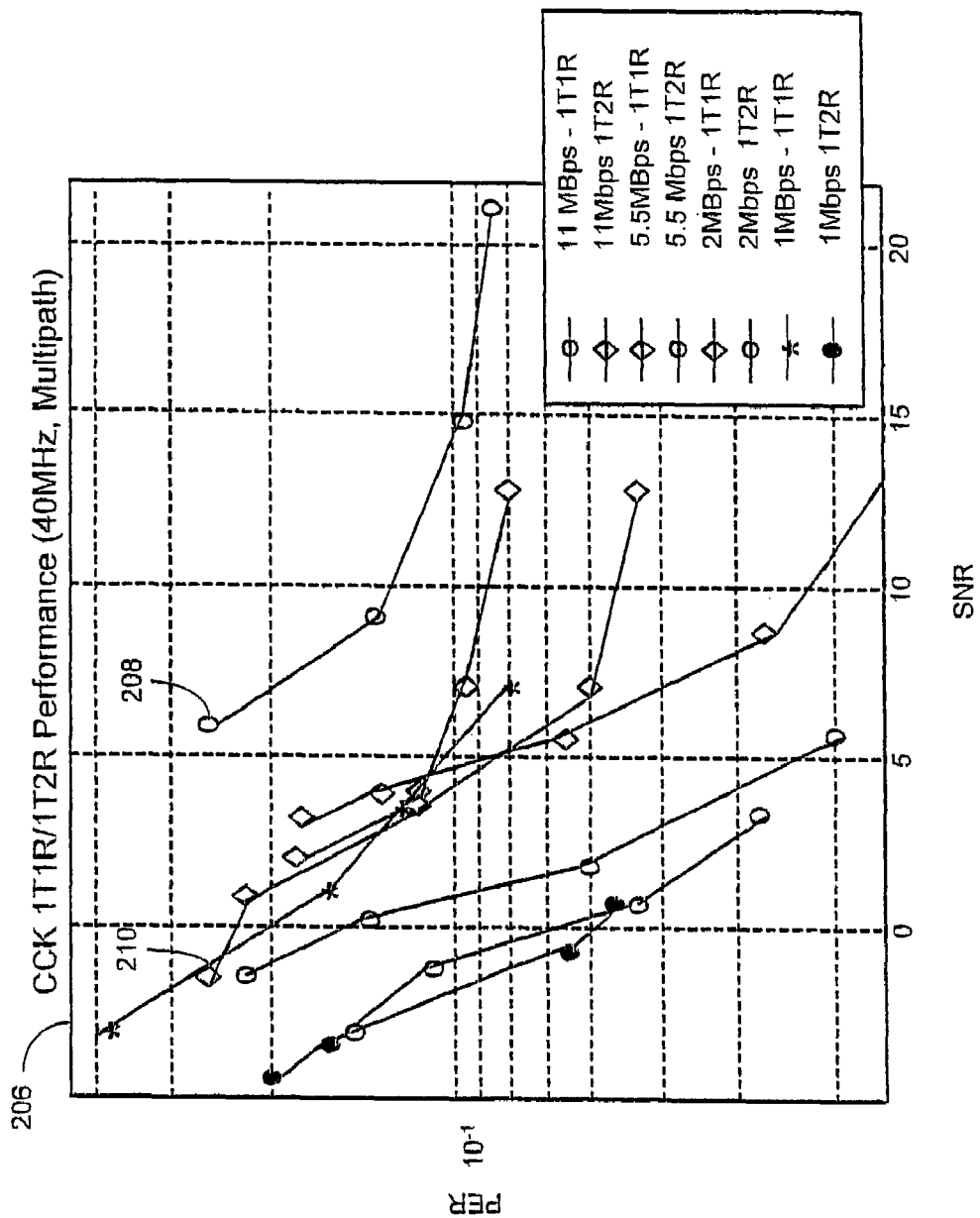
FIG. 7 shows a CCK performance graph for a 1T2R system with multi-path, in accordance with an embodiment of the present invention.

Referring now to FIG. 7, a CCK performance graph 206 for a 1T2R system using multi-path conditions is shown, in accordance with an embodiment of the present invention. Multi-path conditions are a better representation of the realistic channel conditions. The graph 206 has SNR in dB on the horizontal axis and PER on the vertical axis. The performance improvement for the 1T2R CCK MRC system over the 1T1R system is particularly significant for higher data rates. For example, for 11 MBps, the difference between the points 208 and 210 is approximately 8 dB. A summary of results for a plurality of data rates is as follows:

11 MBps 8.0 dB 5.5 MBps 4.0 dB 2.0 MBps 5.0 dB 1.0 MBps 5.0 dB

Figure 8:
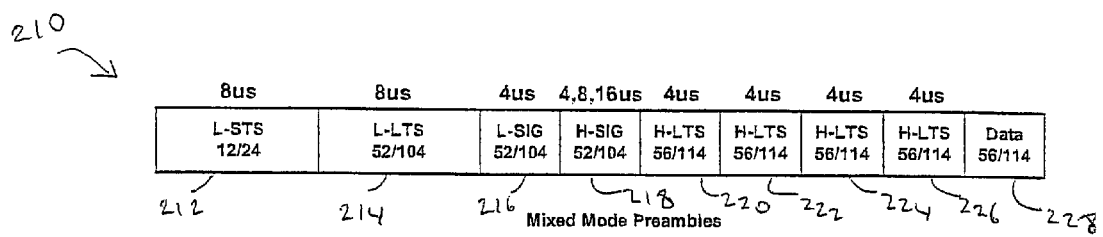
FIG. 8 shows a mixed mode preamble, in accordance with an embodiment of the present invention.

Referring now to FIG. 8, a mixed mode (MM) preamble 210 is shown to include a short training sequence (L-STS) 212, a long training sequence (L-LTS) 214, a first signal field (L-SIG) 216, a second signal field (H-SIG) 218, four long training sequences (H-LTS) 220-226 and a data field 228, in accordance with an embodiment of the present invention. In one embodiment of the present invention the preamble 210 is a Legacy preamble. The preamble 210 is used in a wireless transmission system for transmitting orthogonal frequency division multiplexing (OFDM) data packets to a receiver. The wireless transmission system includes a transmitter for transmitting the data packets.

The short training sequence L-STS 212 is used for several purposes such as automatic gain control (AGC) and packet detection. The long training sequence L-LTS 214 is used for training channel. The L-SIG 216 specifies the modulation mode used for modulating the data packets. The H-SIG 218 has 96 bits and there are three modulation modes to carry the 96 bits. The modulation modes are 16-quadrature amplitude modulation (16-QAM) quadrature phase shift keying (QPSK), and bipolar phase shift keying (BPSK) having data rates of 24 megabytes per second (Mbps), 12 Mbps and 6 Mbps, which take 4 micro-seconds (us), 8 us and 16 us, respectively, to carry the 96 bits. The data field 228 follows the H-LTS 220-226. In another embodiment of the present invention, the H-SIG 218 has a different number of bits. Other types of modulation that may be employed are 16-QAM or 64-QAM.

The OFDM data packets include symbols having 52 or 112 sub-carriers dedicated to transmission of data. In one embodiment of the present invention, adaptive modulation is used to enhance quality of transmission of data by grouping one or more sub-carriers together to form sub-carrier modulated groups. Different sub-carrier modulated groups are modulated using different modulation modes based on the quality of sub-carrier included within the group. For optimal performance every sub-carrier should be modulated independently which necessitates having a long preamble thereby adversely affecting the performance of the wireless transmission system. For example, if 2 bits are needed to specify the modulation mode for each data bit, to transmit 100 bits of data an extra 200 bits are needed in the preamble thus increasing the overhead substantially.

In one embodiment of the present invention, 48 extra bits are included in the H-SIG 218 for adaptive modulation. This is achieved by grouping the sub-carriers of the symbol in each stream into 9 groups of sub-carriers having independent modulation modes, as described in detail hereinbelow. Accordingly, in one embodiment of the present invention, grouping the sub-carriers together causes the total number of bits required for specifying modulation modes to be reduced. In another embodiment of the present invention, a different number of extra bits is included in the H-SIG 218. To maintain a high level of performance higher data rates are used to transmit the 96 bits in the H-SIG 218. For example, at 24 Mbps the 96 bits are transmitted in 4 us as mentioned hereinabove.

Figure 9:
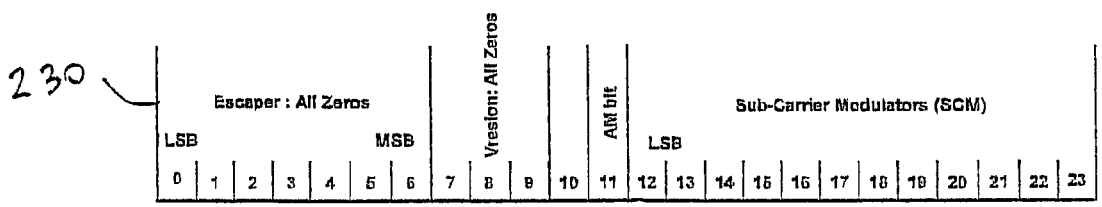
FIG. 9 shows the first 48 bits of a signal field H-SIG, in accordance with an embodiment of the present invention.
Figure 9:
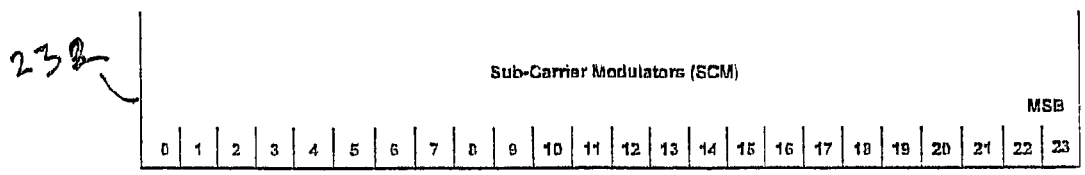

Referring now to FIG. 9, the first 48 bits or Least Significant Bits (LSBs) of H-SIG 218 are shown to include a first 24-bit part 230 and a second 24-bit part 232, in accordance with an embodiment of the present invention. The first 7 bits, denoted as Escaper bits, are all zero and the next 3 bits, denoted by version bits, are set equal to zero.

Adaptive modulation needs to maintain "interoperability" with standard products. 7 escaper bits were in the same position of scramble seed in standard packet. Because scrambler seed can never be 7 zeros, it is used to identify proprietary mode. For standard packet, the packet becomes a not-decodable packet, which is tolerable because adaptive modulation packets will not address a standard device. Version bits are used to update adaptive modulation mode.

The adaptive modulation (AM) bit being the 11$^{th}$ bit is for indicating whether adaptive modulation is turned on or off; one for indicating on and zero for indicating off. The remaining bits are grouped into eighteen 2-bit groups corresponding to each of the sub-carrier modulated groups. The 2-bit groups are for adjusting the modulation mode for each of the sub-carrier modulated groups. Specifically, the eighteen 2-bit groups adjust the modulation mode for each of the 9 sub-carrier modulated groups carried by 2 OFDM data streams. Thus, the 2-bit groups are used to adaptively modulate the sub-carrier modulated groups for improving the performance of the transmitter. In general, in MIMO OFDM wireless transmission systems a plurality of data streams is transmitted to one or more receivers. Generally, in adaptive modulation, 48 extra bits are employed specifying various parameters, such as modulation and data mode length.

The first 2-bit group, SCM0, corresponds to bit number 12 and 13 of the first 24-bit part 230 written as SCM0(MSB, LSB)=[13, 12]. Similarly, SCM1(MSB, LSB)=[15, 14] of the first 24-bit part 230, ..., SCM17(MSB, LSB)=[23, 22] of the second 24-bit part 232 where [.,.] specifies the index shown in FIG. 9.

Referring now to Table 1, the 2-bit groups corresponding to each of the 4 modulation modes used in adaptive modulation of data packets is shown in column 234, in accordance with an embodiment of the present invention. Columns 236-242 indicate the modulation modes 64-QAM, 16-QAM, QPSK and BPSK, respectively. For example, as indicated in column 236, 2-bit groups 00, 01, 10, and 11 represent 64-QAM, 16QAM, QPSK and BPSK modulation modes, respectively. 64 QAM modulation needs 6 bits to indicate one constellation point, 16 QAM needs 4 bits, QPSK needs 2 bits, BPSK needs 1 bit. Table 1 helps to tabulate the reduction on carrier bit while reducing modulation. Column 236 starts with 64 QAM as an example, for example, using BPSK will reduce 5 bits. Column 242 starts with BPSK as reference, so use BPSK will reduce 0 bit. In another embodiment of the present invention other types of modulation modes may be used.

Referring now to Table 2, a list of frequently used parameters in adaptive modulation is provided with the corresponding definitions, in accordance with an embodiment of the present invention. Using the parameters defined in Table 2, the length l of the mixed mode (MM) Legacy SIG field, i.e. H-SIG, to be transmitted at 3 data rates is determined by:

for 6 Mbps: $l=3([N_{DATA}]+N_{LTS}+4)-3$, for 12 Mbps: $l=6([N_{DATA}]+N_{LTS}+2)-3$, for 24 Mbps: $l=12([N_{DATA}]+N_{LTS}+1)-3$.

$N_{LTS}$ stand for the number of long training sequence. (That is H-LTS number). In addition, if the length of the HT SIG field to be transmitted is denoted by $l_{HT}$=length then the number of symbols in the data field $N_{SYM}$, ($N_{SYM}=N_{DATA}$) is determined by:

$$N_{SYM}=[(8\times length+16+6\times N_{ES})/N_{DBPS\_AM}].$$

NES stands for the number of encoder streams (refer to FIG. 13, there could be one or two encoder) and HT SIG field stands for high throughput signal field (H-SIG is denoted most of the time).

Total reduced bits per symbol, $N_{RBPS}$, multiplied by the code rate must be an integer to allow calculation of the number of data bits per symbol with adaptive modulation, $N_{DBPS\_AM}$ according to:

$$N_{DBPS\_AM}=N_{DBPS}-\text{Code\_Rate} \times \Sigma_{\{K=0 \ldots NDSC-1\}} N_{RBPSC\_K},$$

or $$N_{DBPS\_AM}=N_{DBPS}-\text{Code\_Rate}-N_{RBPS}.$$

It should be noted that by using the same modulation mode for each of the sub-carrier modulated groups the number of bits required to specify the modulation modes is reduced thereby improving the wireless transmission system substantially. In one embodiment of the present invention the improvement is of the order of 10 decibels (dB).

The receiver upon receiving the transmitted data packets determines the appropriate modulation mode for decoding the received data. The received data include received sub-carriers that are decoded by the receiver.

In addition, the receiver estimates the modulation mode best suited for the received data packet and the next data packet to be transmitted. The estimation of the modulation mode is based on the quality of the received sub-carriers. The estimated modulation mode is sent back to the transmitter as the recommended modulation mode for the sub-carriers included in a sub-carrier modulated group. Accordingly, each sub-carrier modulated group has an independent modulation mode.

Figure 10:
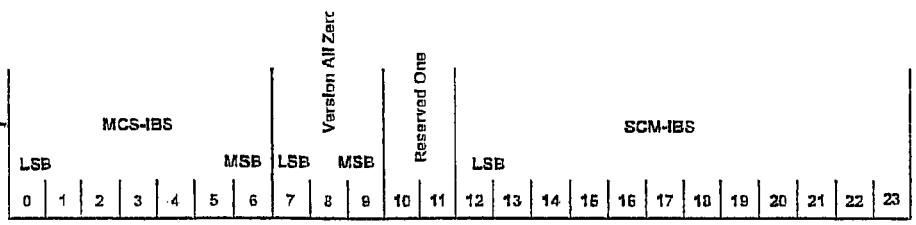
FIG. 10 shows 48 bits of the H-SIG in two parts, in accordance with an embodiment of the present invention.
Figure 10:
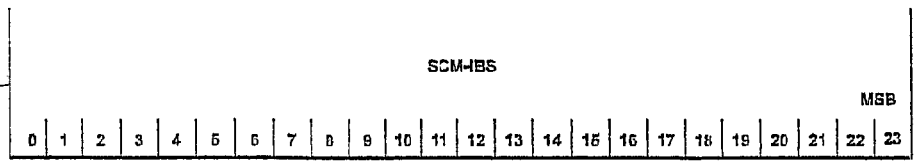

Referring now to FIG. 10, 48 bits of the H-SIG are shown to include a first part 246 and a second part 248, in accordance with an embodiment of the present invention. There are two types of format needs to be identified. FIG. 9 shows the format sit in H-SIG (from transmitter to receiver). FIG. 10 shows the recommended MCS data (from receiver to transmitter). FIG. 10 is not carried by H_SIG, it is carried in DATA to suggest transmitter use the specified data for future H-SIG (then becomes FIG. 9). In-band signal just to indicate the signal using DATA field for PHY, physical layer, purpose. (Usually DATA field is used to carrier MAC, medium access control, level data).

Figure 11:
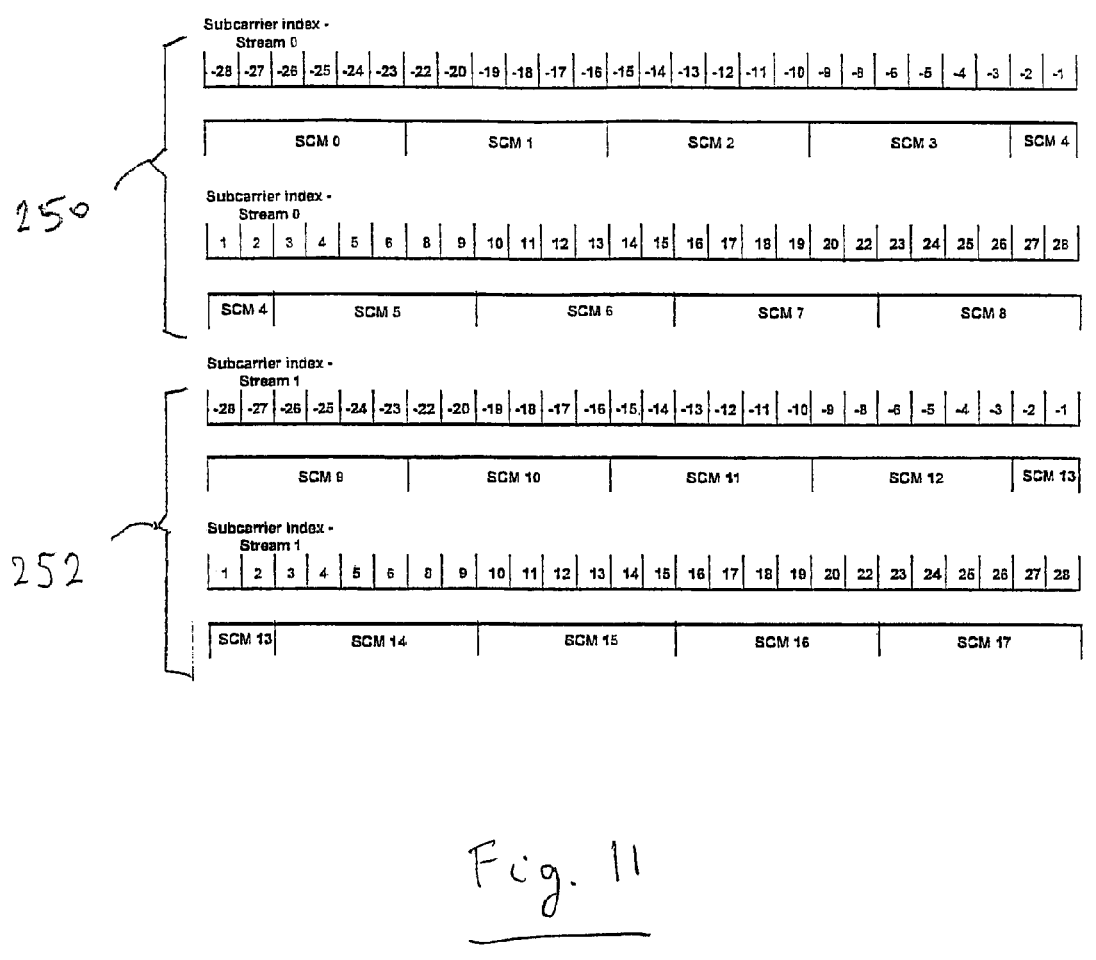

Referring now to FIG. 11, two data streams 250 and 252 in 20 Mega Hertz (MHz) band having 9 sub-carrier modulated groups each are shown, in accordance with an embodiment of the present invention. For data stream 250 the 9 sub-carrier modulated groups are SCM0, SCM1,..., SCM8 and for data stream 252 the 9 sub-carrier modulated groups are SCM9, ..., SCM17. Each of the sub-carrier modulated groups covers 6 sub-carriers except SCM4 and SCM13 which cover 4 sub-carriers each. Foe example, SCM0 covers the sub-carriers −28, −27, ..., −23 while SCM4 covers the sub-carriers −2, −1, 1, 2. Every sub-carrier modulated group may have one of the modulation modes deemed more suitable for adaptive modulation. The type of modulation mode foe each sub-carrier modulated group is specified by the receiver as mentioned hereinabove.

Figure 12:
FIG. 12 shows two data streams in the 40 MHz band, in accordance with an embodiment of the present invention.

Referring now to FIG. 12, two data streams 256 and 258 in the 40 MHz band having 9 sub-carrier modulated groups each are shown, in accordance with an embodiment of the present invention. Data stream 256 includes sub-carrier modulated groups SCM0, ..., SCM8 while data stream 258 includes sub-carrier modulated groups SCM9, ..., SCM17. Every sub-carrier modulated group covers 12 sub-carriers, e.g. SCM0, which covers the sub-carriers −58 to −48. Every sub-carrier modulated group has an independent modulation mode that is deemed more suitable for adaptive modulation.

Figure 13:
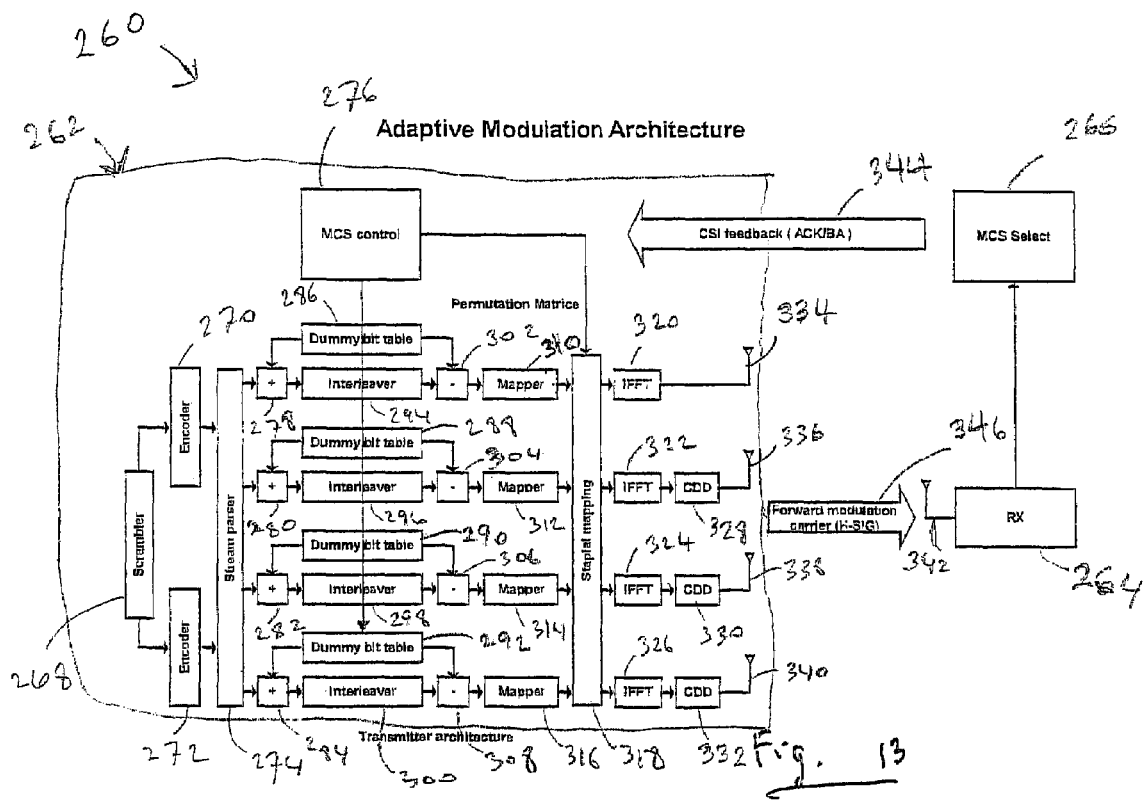
FIG. 13 shows the architecture of a wireless transmission system with adaptive modulation, in accordance with an embodiment of the present invention.

Referring now to FIG. 13, the adaptive modulation architecture for a wireless transmission system 260 is shown to include a transmitter 262, a receiver 264 and an MCS select module 266, in accordance with an embodiment of the present invention. MCS stands for modulation coding scheme. Data packets are transmitted from the transmitter 262 to the receiver 264 via forward modulation carrier or H-SIG. The receiver 264 is coupled to the MCS select module 266 which transmits the specified modulation modes as channel state information (CSI) feedback back to the transmitter 262. SNR per-sub carrier is used to select the best adaptive modulation scheme. The designed AM in the format of FIG. 10 is sent back to transmitter piggy back to ACK/BA. In this sense, MCS select sends CSI (channel state information, AM is one type of CSI) back to transmitter.

Transmitter 262 includes a scrambler 268, two encoders 270 and 272, four summation modules 278-284, a stream parser 274, four interleavers 294-300, four dummy bit insertion modules 302-308, four mapping modules or mappers 310-316, a spatial mapping module 318, four inverse Fast Fourier Transform (IFFT) modules 320-326, three CDD modules 328-332 and four antennas 334-340, in accordance with an embodiment of the present invention.

CDD stands for cyclic delay diversity. Cyclic delay diversity cyclic shifting data in certain defined delay. It is specified in the new 802.11n standard. CDD for different than inverse fast fourier transform (IFFT). The first CDD value is zero so it is omitted.

The scrambler 268 is coupled to the encoders 270 and 272 which are coupled to the stream parser 274. The stream parser 274 is coupled to the summation modules 278-284 which are coupled to the interleavers 294-300 which are coupled to the subtraction modules 302-308, respectively. The dummy bit insertion modules 286-292 are coupled to the summation modules 278-284 and subtraction modules 302-308, respectively. The subtraction modules 302-308 are coupled to the mapping modules 310-316, respectively, and the latter are coupled to the spatial mapping module 318 which is coupled to the IFFT modules 320-326. The MCS control module 276 is coupled to the dummy bit insertion modules 286-292 and the spatial mapping module 318. The IFFT modules 322-326 are coupled to the CDD modules 328-332 which are coupled to the antennas 336-340, respectively. The IFFT module 320 is coupled to the antenna 334.

Encoders 270-272 encode the scrambler output to generate encoded signals which are encoded bit by bit by the stream parser 274 to generate four data streams. Dummy bits from the dummy bit tables included in the dummy bit insertion modules 286-292, are inserted into the data streams at the summation modules 278-284, respectively. The inserted dummy bits correspond to the reduced modulation bits of the sub-carrier modulation groups used in the mapping modules 310-316. The outputs of the summation modules are interleaved at the interleavers 294-300, respectively, to generate interleaved streams. The dummy bits are removed from the interleaved streams at the subtraction modules 302-308.

The output of the subtraction modules 302-308 is mapped into constellation points, by the mapping modules 310-316, respectively. That is, the mapping modules 310-316 map the bits in the output of the subtraction modules 302-308 into constellation points. The spatial mapping module 318 arranges the constellation points according to the modulations specified by the MCS control module 276.

Specifically, the receiver 264, upon receiving the received data packets specifies the modulation mode best suited for transmission thereof based on the quality of the received sub-carriers. That is, the receiver 264 specifies constellation designs for bit encoding of the sub-carrier modulated groups based on signal quality of the received sub-carriers. The modulation modes recommended by the receiver 264 are selected by the MCS select module 266 and transmitted to the transmitter 262 as CSI feedback 344. In one embodiment of the present invention the CSI feedback 344 is included in the acknowledgement (Ack/BA) message sent by the MCS select module 266 to the transmitter 262. BA stands for block ACK. In other embodiments of the present invention the CSI feedback is sent to the transmitter 262 with a different mechanism.

The MCS control module 276 receives the CSI feedback 344 and processes the same to generate permutation matrices which are sent to the spatial mapping module 318. The spatial mapping module 318 arranges the constellation points according to the modulation specified by the permutation matrices.

In addition, the output of the MCS control module 276 is used for constructing the dummy bit tables included in the dummy bit insertion modules 286-292. The de-interleaver formula from the reduced modulation bits is used to construct the dummy bit tables. The dummy bit table size per stream may be as big as the maximum bit number per symbol per stream.

The spatial mapping module 318 generates a mapped output that is transferred to the IFFT modules 320-326, wherein frequency domain sub-carriers are converted to time domain samples. The samples are processed by the CDD modules 328-332 to generate output signals. The output signals are transmitted by the antennas 334-340 to the receiver 264 via forward modulation carrier (H-SIG) 346 and are received by the antenna 342. The received data packets are processed by the receiver 264, as described hereinabove.

The transmitter 262, shown in FIG. 13, includes a processor (not shown), or computer medium, some type of storage area and a computer readable medium, for storing the software/firmware described in FIG. 13. The processor executes codes from the computer readable medium for effectuating the functions outlined in FIG. 13.

Figure 14:
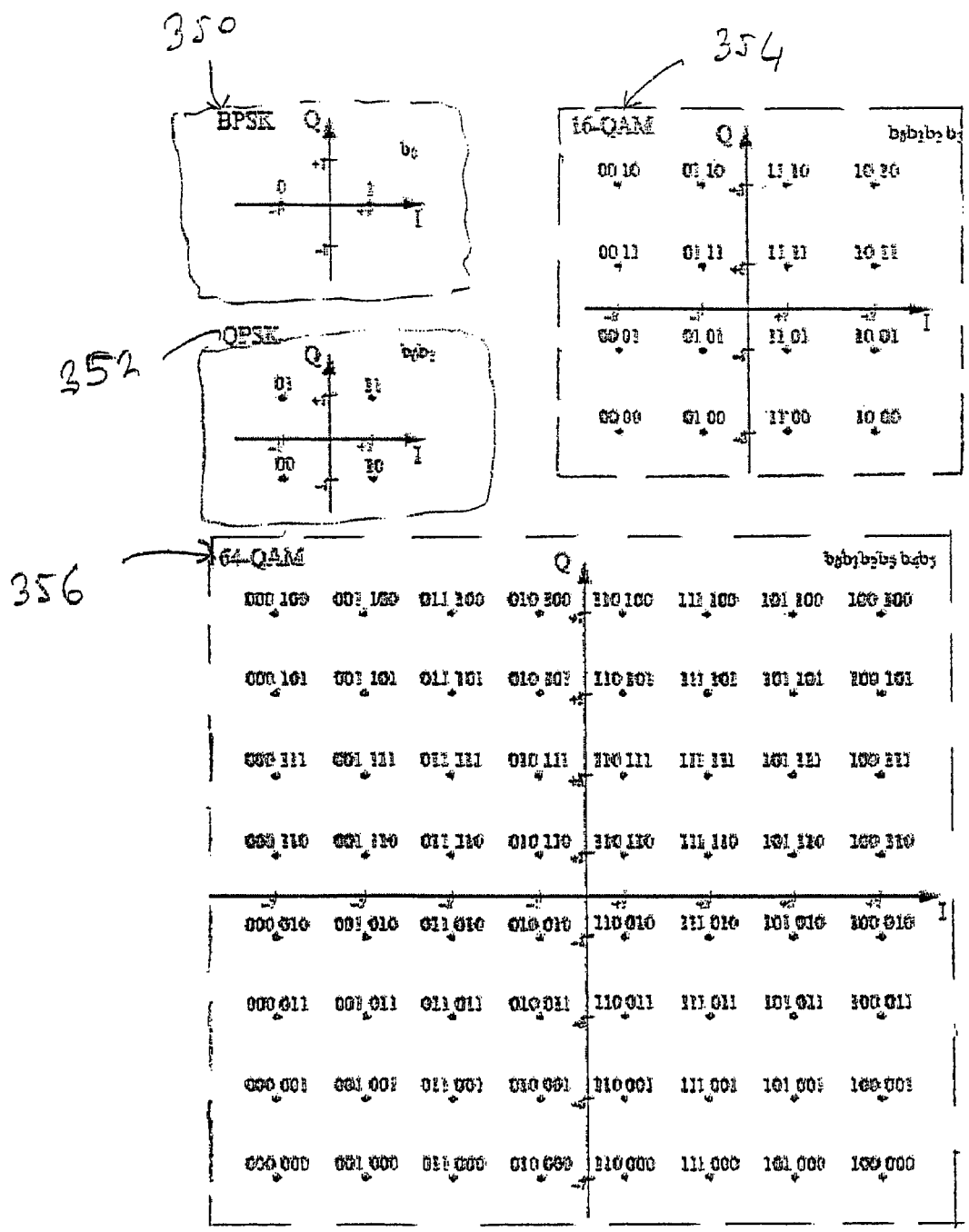
FIG. 14 shows constellation bit encoding for 4 modulation modes, in accordance with an embodiment of the present invention.

Referring now to FIG. 14, constellation bit encoding is shown for the 4 modulation modes mentioned hereinabove, in accordance with an embodiment of the present invention. Thus, the number of encoded bits is given by $2^n$ where n=0, 1, 2, 3, for BPSK, QPSK, 16-QAM, and 64-QAM modulation modes, respectively. As indicated in FIG. 14, for BPSK 1 bit, for QPSK 2 bits, for 16-QAM 4 bits and for 64-QAM 6 bits are encoded. Shown in FIG. 14 are BPSK constellation 350, QPSK constellation 352, 16-QAM constellation 354 and 64-QAM constellation 356.

The receiver 10 of FIG. 1 transmits and receives packets of information with a packet including preambles, the various different formats of which are discussed relative to FIG. 16 and on below in accordance with embodiments of the present invention.

Figure 16:
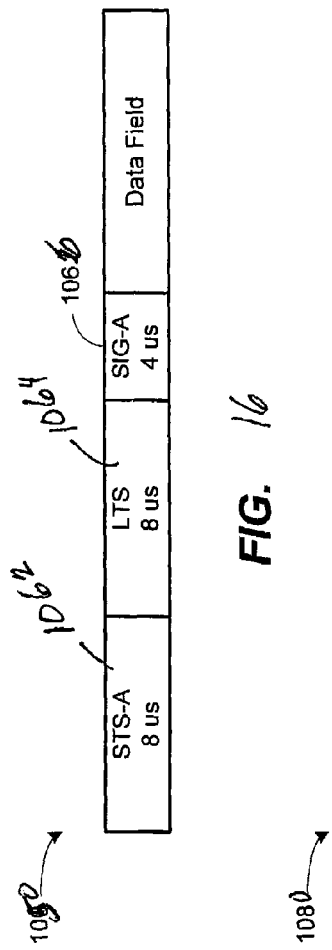
FIG. 16 shows an 802.11a wireless local area network (WLAN) preamble format, which includes short training sequence (STS), long training sequence (LTS) and signal field (SIG), for physical (PHY) receiver training and initialization.

Various preamble formats within a data packet are presented and discussed relative to FIG. 16 and on wherein the benefits of Greenfield signaling, known to those skilled in the art, are achieved while using mixed mode preamble signal field. A legacy signal field is performed to indicate a modulation scheme capable of supporting various data rates, such as the foregoing ranges, rather than be limited to a 6 MHz data rate, such as in prior art schemes. Therefore, flexibility in signaling is accomplished using the embodiments and methods of the present invention. Moreover, signaling is done in-band. In-band signaling refers to reserving some of the physical layer bandwidth for transmitting information regarding the physical (PHY) signal.

The present invention allows for transmission of larger data sizes by including data in the physical layer (the reserved bandwidth) rather than the transport layer, as done by prior art.

Data is essentially piggy-backed by using the physical (PHY) layer to transmit the same and as previously stated, this piggy-backing effect causes in-band transmission because data is transmitted through the PHY layer. To accomplish the same, a PHY layer Identification (ID), or PHY ID, is employed and included in the preamble portion of the transmission of a packet. Apriori information regarding the channel is employed.

Varying data rates, transmitted and received, in wireless communication and in accordance with certain standards' requirements are taken advantage of in the present invention to offer the foregoing benefits.

This is effective in terms of a reduced preamble length and in supporting various data rates among other advantages. Currently, in prior art techniques, the same is not done because the preamble signal field needs to carry enough information whereas not enough space or bits available for doing the same. Essentially, the preamble is short by a symbol length, which in some cases is 4 micro seconds.

Additionally, compatibility of the various standards is desirable and the present invention presents a preamble format so that the standards of the 802.11(a) as well as 802.11(g)

as well as 802.11(n) specifications for data rate requirement are met and signal rates of a range anywhere between 6 Mega (M) Hertz (Hz) and 54 MHz and 500 MHz and 700 MHz are met.

Figure 15:
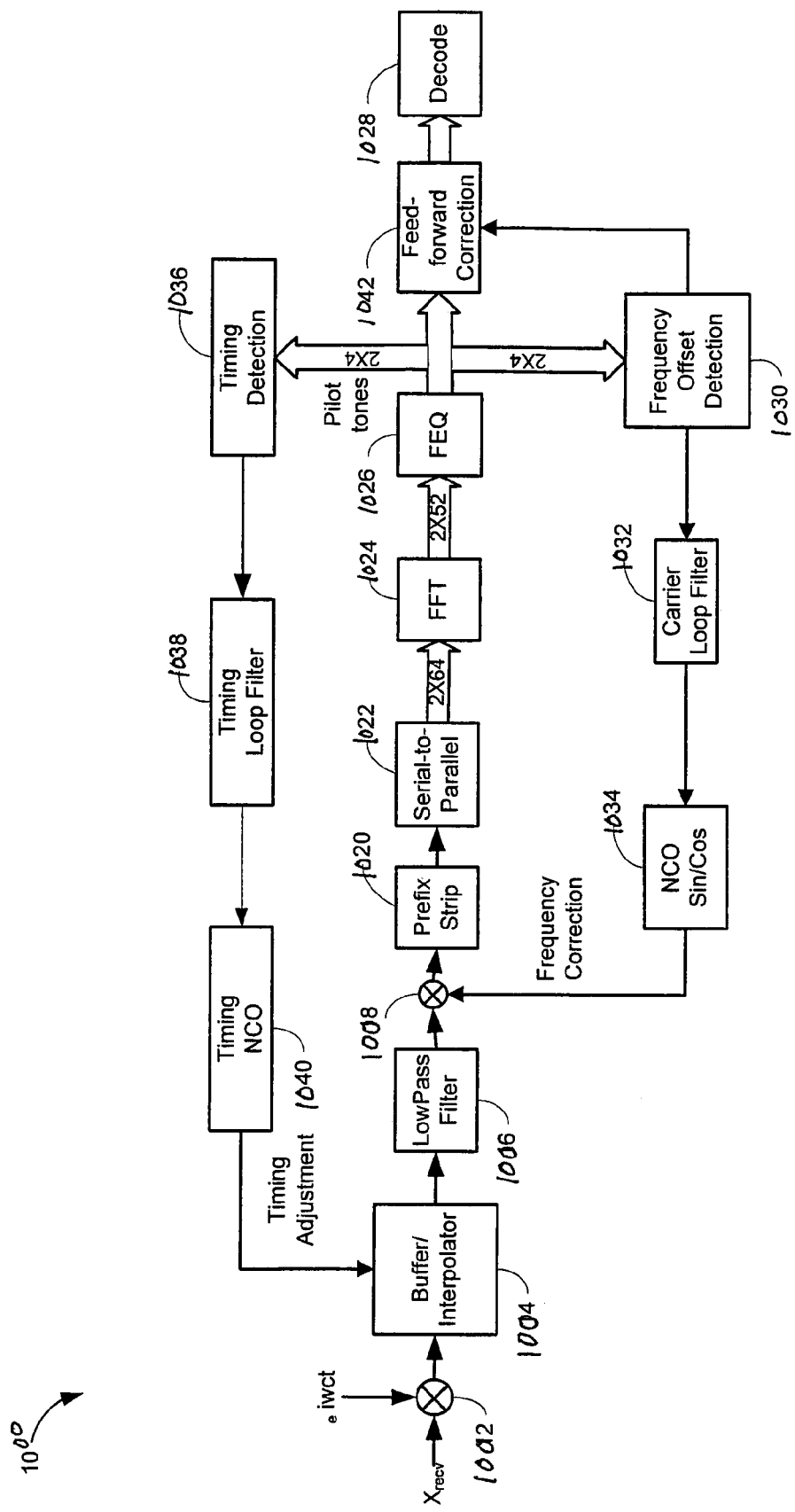
FIG. 15 shows a block diagram 1000 of the architecture of an IEEE 802.11g or 802.11a orthogonal frequency division multiplexing (OFDM) modem receiver, in accordance with an embodiment of the present invention.

Another embodiment of the present invention is presented in FIG. 15 wherein a block diagram 1000 of the architecture of an IEEE 802.11a or 802.11g (802.11a/g) orthogonal frequency division multiplexing (OFDM) modem receiver 1001 is shown, in accordance with an embodiment of the present invention. The block diagram 1000 includes a first frequency shifter 1002, a buffer/interpolator 1004, a low pass filter 1006, a second frequency shifter 1008, a serial to parallel (S/P) converter 1022, a fast Fourier transform (FFT) analyzer 1024, a frequency domain equalizer (FEQ) 1026, a decoding module 1028, a frequency offset detection module 1030, a frequency loop filter or a carrier loop filter 1032, a timing loop filter 1038, a timing numerically controlled oscillator (NCO) 1040, a carrier NCO 1034, a timing offset detection module 1036 and a feedforward correction module 1042.

Input signals comprising information packets are received by the frequency shifter 1002, which is coupled to the buffer/interpolator 1004. The buffer/interpolator 1004 is coupled to the low pass filter 1006 that is coupled to the frequency shifter 1008. The latter is coupled to the prefix strip 1020. The prefix strip 1020 is coupled to the FFT analyzer 1024, which is coupled to the FEQ 1026. The FEQ 1026 is coupled to the feedforward correction module 1042, the timing offset detection module 1036, and the frequency offset detection module 1030. The frequency offset detection module 1030 is coupled to the frequency loop filter 1032, which is coupled to the NCO 1034. The latter is coupled to the frequency shifter 1008. The timing offset detection module 1036 is coupled to the timing loop filter 1038, which is coupled to the NCO 1040. The NCO 1040 is coupled to the buffer interpolator 1004. The feedforward correction module 1042 is coupled to the decoding module 1028.

Input signals in the intermediate frequency (IF) range, such as 10 Mega Hertz (MHz), are received by the frequency shifter 1002. The transmitted signal is initially received in an analog format by an antenna through a radio frequency (RF) receiver (not shown in FIG. 15). The received signal is converted by an analog-to-digital converter (ADC) into digital format to generate the input signals. In an alternative embodiment of the present invention the RF receiver produces a base band signal directly (Zero-IF) thereby eliminating the need for the frequency shifter 1002.

However, communication channel conditions are often such that multiple copies of the transmitted signal are received by the RF receiver because of multiple reflections of the transmitted signal from objects and surfaces (e.g. walls, ceiling, trees) in the receiver environment. Such a mode of reception is referred to as a multi-path channel. Multi-path channel may impede detection and compensation of the timing offset and carrier frequency or carrier offset between the transmitted signal and the input signal. The present invention alleviates such negative multi-path effects by correcting carrier frequency and sampling rate offsets through the frequency offset detection module 1030 and the timing offset detection module 1036, as described in more detail hereinbelow.

In one particular baseband RF implementation, the input signal at the intermediate frequency (IF) is converted by the frequency shifter 1002 to a baseband (frequency) signal, which is transferred through the buffer/interpolator 1004 where the timing offset is corrected to generate a buffer/interpolator output. The buffer/interpolator output is transferred through a lowpass filter, in order to remove unused spectrum, to the frequency shifter 1008. The frequency shifter 1008 applies the correction for the carrier frequency offset or carrier offset to the filtered baseband signal based on the frequency feedback information in the form of frequency correction signal received from the NCO 1034 to generate the adjusted signal. The adjusted signal is transferred to the prefix strip 1020, where the guard interval between symbols is removed. The output of the prefix strip 1020 is transferred to the serial-to-parallel converter S/P 1022 where a vector signal of 64 sample values is generated. The vector, signal of 64 samples is then transferred to the FFT module 1024.

In one embodiment of the present invention, the FFT module 1024 performs a 64-point FFT converting the 64 time domain samples into 64 frequency domain subcarriers, which comprise one data symbol. As specified by the 802.11a/g standard, each symbol has 64 subcarriers, of which 12 are reserved for guard band separation and 52 are dedicated to the transmitted signal. Of these 52 subcarriers dedicated to the transmitted signal, 4 are allocated as pilot tones for timing and frequency correction while the remaining 48 subcarriers carry the contents of the information packet (i.e., data subcarriers).

To correct the effects of multi-path channel the FEQ 1026 applies complex scaling factors, or gains and phases, to compensate for the channel response for each data symbol. The FEQ 1026 is trained once during the preamble portion of the information packet, by an FEQ Training Module (FTM) (discussed in detail in relation to FIG. 20). The FEQ 1026 is trained to correct for the instantaneous channel conditions on each subcarrier for the remainder of the information packet. Specifically, if a particular subcarrier is deeply faded, the FEQ 1026 applies a large gain thereto to amplify the response of the subcarrier.

Large FEQ gain, however, also amplifies the noise component associated with the subcarrier and, if the particular subcarrier is a pilot tone, the large FEQ may adversely affect the performance and stability of the carrier frequency and timing frequency offset loops. To avoid adverse multi-path channel, the frequency offset detection module 1030 and the timing offset detection module 1036 apply appropriate weights to the pilot tones. The weights are computed during the preamble portion using the FEQ coefficients corresponding to the pilot tones, or the pilot tone FEQ coefficients, by the Offset Weight Determination (OWD) module, as discussed hereinbelow. The carrier weights: $W_1$, $W_2$, $W_3$ and $W_4$ are transferred to the frequency offset detection module 1030, while the timing weights, $M_1$ and $M_2$, are sent to the timing offset detection module 1036. The weights are used throughout the duration of the packet to ensure proper functioning of the carrier and timing offset loops by mitigating the high pilot noise that can result from the presence of a multi-path channel, as discussed above.

The timing and carrier offset loops are updated on a per symbol basis, using the four pilot tones from the FEQ module 1026 to update the frequency offset detection module 1030 and the timing offset detection module 1036, as depicted in FIG. 15. The output from the frequency offset detection module 1030 updates the loop filter 1032, which causes the NCO 1034 to produce proper frequency correction that is applied at the multiplier shifter 1008, on a sample-by-sample basis. In another embodiment of the present invention, NCO 1034 generates proper frequency correction that is applied at the multiplier shifter 1008 on a symbol-by-symbol basis. Similarly, the timing detection module 1036 output updates the timing loop filter 1038 which generates a timing loop filter output used in the timing NCO 1040 to control the rate of interpolation at the buffer/interpolator 1004 by generating a timing adjustment signal. The buffer/interpolator 1004 resamples the baseband signal to adjust the timing offset using the timing adjustment signal. In total, the blocks mentioned hereinabove together with the common blocks 1006, 1020, 1022, 1024 and 1042 comprise the frequency offset and timing offset control loops.

According to the 802.11a/g standard, among the 52 subcarriers 4 are the pilot tones 50-56. The pilot tones are essentially equally spaced among the subcarriers, correspond approximately to the 7, 21, 35, and 49th subcarriers. For each symbol as processed by the FEQ 1026, the four pilot tones are extracted and used to compute the carrier offset. Each pilot tone is demodulated by the FFT 1024, FEQ 1026 processing as a BPSK (binary phase shift keying) symbol, and may be expressed as a complex number, $p_i$, i=1, 2, 3, 4, corresponding to the locations 7, 21, 35 and 49, respectively.

FIG. 16 shows an 802.11a WLAN preamble format 1050, which includes short training sequence (STS) 1062, long training sequence (LTS) 1064 and signal field (SIG) 1066, in accordance with an embodiment of the present invention. A physical (PHY) receiver receives information in the 802.11a WLAN preamble format 1050. The physical (PHY) receiver will use preamble to train and initialize receiver states. STS 1062 provides packet detection, AGC, frequency and timing offset estimation, and symbol alignment. LTS 1064 provides channel estimation and frequency offset estimation opportunity to support required performance. SIG field needs to be robust enough and carry large enough message. The total duration of the 802.11a preamble is 20 us although other durations are anticipated.

Figure 17:
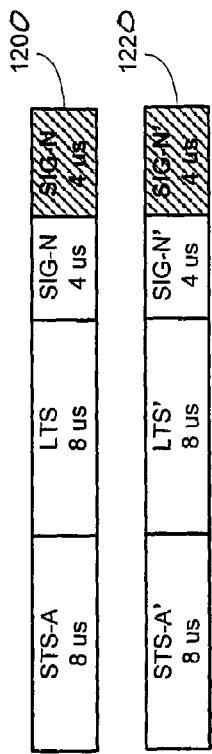
FIG. 17 shows World Wide Spectrum Efficiency (WWiSE) Greenfield preamble format for two streams case.

FIG. 17 shows WWiSE Greenfield preamble 1080 for 2 streams case, a stream 1200 and a stream 1220 to be received by a receiver. A Greenfield preamble 1080 is designed for new 11n modes only to reduce overhead with backward compatibility with legacy devices, and hence improve preamble efficiency. Greenfield design is the strength of WWiSE preamble design as compared to TGnSync preamble. STS-A is the same as 11a short training sequence. STS-A' is a cyclic delay shifted version of STS-A. LTS is the same as 11a long training sequence. LTS' is a cyclic delay shifted (CDS) version of LTS by 1600 ns, which is an important design of WWiSE preamble. The CDS version of LTS provides 2×2 MIMO channel training opportunity and second frequency offset estimation at the same time (double symbol length or 8 us only). However this design also bring up several issue, like non-per tone based channel estimation, which is more complex than per-tone based channel estimation and less suitable of transmit (TX) beamforming feature. TX beamforming is a technique to focus more energy on the desired direction. SIG-N is rate ½ convolutional coded quadrature phase shift keying (QPSK), which can carry two times the message of rate ½ coded bipolar phase shift keying (BPSK), however it is less robust. Under range extension mode, optional extra SIG-N is used to enhance the robustness of SIG-N. Greenfield preamble for 2-streams case is 20 us for non-extended range mode, and 24 us for extended range mode.

Figure 18:
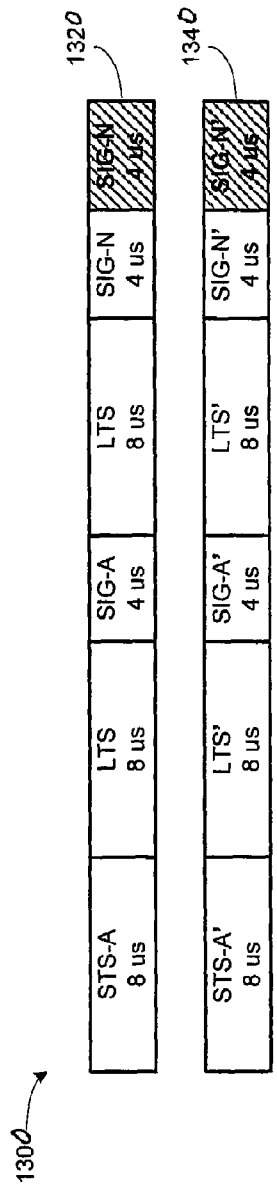
FIG. 18 shows WWiSE mixed mode preamble format for two streams case.

FIG. 18 shows WWiSE mixed mode preamble 130 for 2 streams case, a stream 1320 and a stream 1340. A mixed mode preamble means it is designed with backward compatibility with legacy devices in mind. However the drawback is less efficient preamble. WWiSE mixed mode preamble for 2 streams case is 32 us for non-extended range mode, and 36 us for extended range mode. Mixed mode preamble starts with legacy preamble, with the second stream adding cyclic delay shift. A second LTS follows the legacy SIG-A, is used to train MIMO channel matrix, which is the same as Greenfield design. SIG-N is also the same as Greenfield design.

Figures 19, 23:
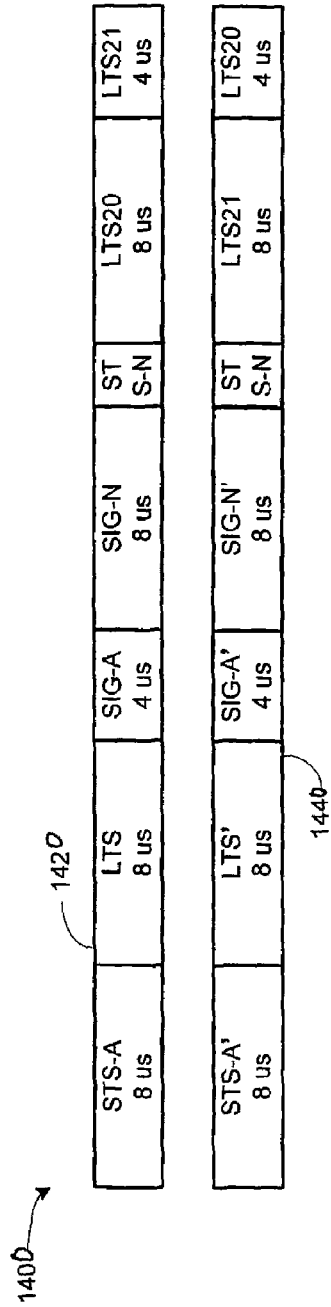
FIG. 19 shows Task Group N Synchronization (TGnSync) mixed mode preamble format for two streams case.
FIG. 23 shows nested preamble format for transmit beamforming for four streams case.

FIG. 19 shows TGnSync preamble 1400 for 2 streams case, a stream 1420 and a stream 1440 to be received by a receiver. TGnSync preamble starts with legacy preamble similar to WWiSE mixed mode. 8 us SIG-N follows the legacy preamble, which is noticeably different from WWiSE approach. SIG-N before long training provides several advantages, like noticing receiver how many antenna mode to expect for the following LTS; and SIG-N is immediately decodable by all receivers just like SIG-A. However, the drawback in this approach is not suitable for Greenfield type approach. SIG-N followed by second STS for second AGC control, which also indicate the start of TX beamforming if selected. 11n LTS is a sub-carrier interleaved (poly-carrier) version of legacy 11a LTS. LTSmk denotes index k within a set of m poly-carrier subsets, k=0 . . . m−1. For example LTS21 means there is totally 2 poly-carrier subsets, the index 1 is selected. Given constant transmit power, poly-carrier LTS does not provide advantage against simpler antenna interleaving, that is antenna 1 occupies the first LTS slot wholly and only, antenna 2 occupies the second LTS slot; etc. However in practice, power amplifier (PA) will limit transmit power, poly-carrier approach provide chance to turn on all PA at the same time during LTS, thus is preferred. The first 11n LTS is 8 us to provide another chance for frequency offset estimation. The second 11n LTS is shortened to 4 us as a compromise to more effective preamble design.

The major issue with TGnSync is lack of Greenfield preamble design, more generally the preamble is less efficient. The major issues with WWiSE preamble design are 1. forward/backward compatibility within 11n is not well thought, 2. per-tone based channel estimation is not available.

The foregoing issue is resolved by the present invention. To provide better compatibility nested preamble is provided, a nested preamble is defined as receivers do not know the number of transmit antennas before decoding SIG-N. Notice that with nested preamble property, forward/backward compatibility within 11n is satisfied. FIG. 20 shows a proposed Greenfield preamble design 1500 to be received by a receiver. Short training sequence is STS-N 1520, which is different from legacy STS-A so that Greenfield and mixed mode can be distinguished as soon as possible. Using STS-N rather than STS-A has the advantage of requiring a smaller decoder in the receiver to identify the Greenfield preamble. One design of STS-N is through polarity change of STS-A. Multiple streams STS-N is provided by CDS, which is the same as WWiSE and TGnSync design. Poly-carrier LTS and SIG-N are used to provide nested preamble. Notice that with poly-carrier training sequence and signal field, receivers do not need to know what is the transmit antenna number, that is receivers are free to use their own number of receiver antennas to interpret LTS and SIG-N. This is achieved by dividing the signal to be transmitted into a plurality of subsets each of which being transmitted by a different antenna. Once received by the receiving antennas the plurality of subsets may be merged together to recover the transmitted signal. Thus, the number of transmitter antennas is independent of the number of receiver antennas. LTS is used for two purposes 1. Train receiver for decoding SIG-N, 2. To be reused to construct MIMO channel matrix using training sequences following SIG-N. For example, for the two antenna case 2 poly-carrier LTS are used to construct the 2×2 channel matrix. Similarly, for the three antenna case 3 poly-carrier LTS are used to construct the 3×3 channel matrix.

LTS is double symbol length that is 8 us, so that second frequency offset estimation can be conducted. It also provides more robust training for SIG-N receiving. To provide compatibility poly-carrier LTS of 8 us duration are reused for both legacy and 11n preambles. SIG-N is also double symbol length with rate ½ coded BPSK, which provides one set of robust SIG-N design, which is the same as TGnSync design. Second poly-carrier LTS follow SIG-N are all single symbol length. Notice that poly-carrier LTS provide per-tone based channel estimation. In summary, the proposed Greenfield design provides an efficient design for TGnSync Greenfield preamble. It also resolves the compatibility and per-tone based training issue of WWiSE preamble. Given a 2 streams case, new Greenfield design requires 28 us, which is 4 us or 8 us longer than WWiSE Greenfield, but 4 us or 8 us are shorter than WWiSE mixed mode and 14 us shorter than TGnSync preamble. Besides efficiency and/or resolve previous issue, this preamble framework is generic enough that trade-off and variation can be made, for example, a poly-carrier can be used for STS-N instead of CDS. An option in SIG-N to allow double length LTS after SIG-N to allow robust training sequence can be used. More importantly, variations and trade-offs are given at following two designs.

FIG. 21 shows the preamble variation 1600 to merge Greenfield with mixed mode preamble. Notice that there are only two changes, firstly, STS-N is not needed, because there is no Greenfield or mixed mode, there is only one preamble format. So STS-A is used. The second change is double symbol length SIG-N has been partitioned into single symbol length SIG-A and SIG-N. Notice that up to SIG-A it is still a legacy 11a preamble from receiver viewpoint. The 13 bits length field in SIG-A is reused to indicate length of 11n packet such that 4 us SIG-N will be enough to provide the required 11n features. Thus, a marriage of Greenfield and mixed mode preamble is provided without increasing any preamble length.

Up to this point new proposed preambles haven't provided TX beamforming capability. Thus, such feature is now added as a optional mode by indicating at SIG-N. FIG. 22 and FIG. 23 show the preamble extension for TX beamforming. After SIG-N a second AGC opportunity is added by using a second 4 us STS-A to align symbol boundary for simplicity. A second poly-carrier LTS is added after second STS-A to retrain the first phase of channel matrix. Notice that TX beamforming is added after the second STS-A, earlier trained LTS can not be reused for channel matrix construction. Given a 2 transmitter 1 receiver stream (2T1S1R) case, the proposed TX beamforming preamble format requires 32 us, which is still 6 us shorter than TGnSync's corresponding preamble. Only when transmit antenna number is greater than transmit streams, the beam forming effect can take place in current 11n purposes, so there is no need to provide TX beamforming preamble format for those cases that transmit antenna number is the same as transmit streams. However they can be added if necessary.

Figure 24:
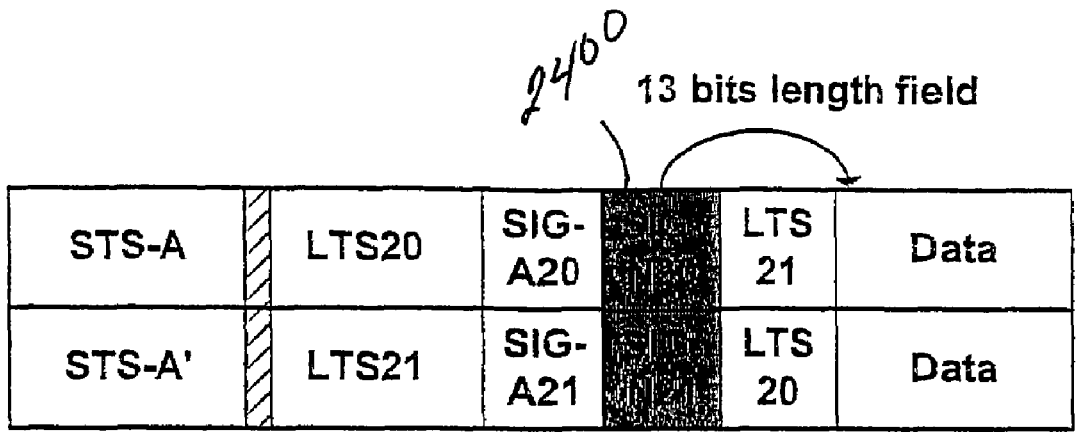
FIG. 24 shows an exemplary preamble format allowing reduction of the duration of the SIG-N from 8 us to 4 us, in accordance with another embodiment of the present invention.

FIG. 24 shows an exemplary preamble format allowing reduction of the duration of the SIG-N from 8 us to 4 us, in accordance with another embodiment of the present invention. This is referred to as in-band signaling because the signal, such as the signals SIG-N20 and SIG-N21, is placed in the data field 2400 (in-band). In this manner, varying data rates can be flexibly employed.

The legacy field has indicated the duration of the packet but the precise number of bytes need be employed, which still need 13 bits. However these 13 bits are less timing critical and thus can be placed in the data field to reduce the number of bits needed for SIG-N, using WWiSE as example 8 us rate ½ BPSK can carry 54 bits, WWiSE SIG-N uses 40 bits. If 13 bits are moved out to the data field then SIG-N only need 40−13=27 bits, which is exactly the data 4 us can carry. Notice that the 13 bits moved out to data field might create some overhead, but it is very flexible in the sense that with a high data rate where high throughput is required, the overhead of 13 bits is relatively small; with low data rate, the 13 bits overhead even though higher in time now will bring less impact on throughput because the packet will be longer too.

Figure 25:
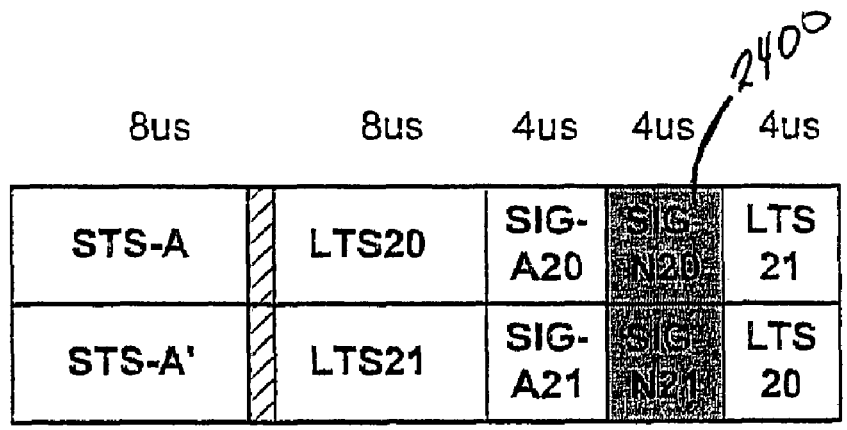
FIG. 25 shows another exemplary preamble format for transmit beamforming for four streams case.
Figure 25:
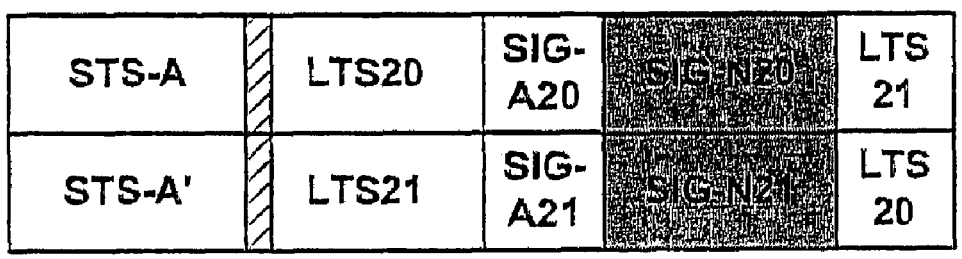

In-band signaling even though marginally working for supporting the idea to merge Greenfield and mixed mode is still somewhat limited. If one starts to add more features into the standard, SIG-N still will grow out of 4 us. FIG. 25 shows another exemplary preamble format allowing flexible signaling. The idea of flexible signal is that instead of using a fixed modulation mode for SIG-N, legacy signal field SIG-A is used to indicate modulation and coding for SIG-N. That is, there are 7 higher speed modes in total, at a rate of ½ BPSK. A high enough rate is used to support SIG-N for 4 us. Again for high data rate, the 4 us length is optimized. For low data rate, the overhead of 8 us will not have significant impact on the overall throughput. It is better than in-band signal for reducing overhead and removing unnecessary constraints.

Table 3 is a table of the capacity of different modulation mode, and excess data to support SIG-N. Excess bits are used to support more advance feature(s) such as adaptive modulation, which will need to specify different modulation scheme for different sub-carriers.

Flexible signaling and in-band signal all have their own unit position. Flexible signaling provides the maximum signal capacity one can carrier after partial channel is trained, however it is important for function like signaling to start here to provide timing critical PHY related information, while in-band signaling can provide the maximum signal capacity after the MIMO channel is fully trained. An idea application of in-band signaling is used as channel state information feedback, which will carry large less timing critical PHY information. With in-band signaling one can pre-attach channel state information back to transmitter every packet without extra packet.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A receiver system for receiving packets of information in a multi input multi output (MIMO) communications system comprising:
  a synchronization module responsive to a first received baseband signal, including subcarriers, from a first antenna and a second baseband signal, including subcarriers, from a second antenna, each of said first and second received baseband signals including a respective orthogonal frequency division multiplexing (OFDM) modulated signal and a respective time domain complementary code keying (CCK) modulated signal, the synchronization module operative to align the OFDM modulated signals in the time domain and to generate two aligned OFDM signals, the synchronization module further operative to compute maximum ratio combining (MRC) parameters for the time domain CCK modulated signals included in the received baseband signals;
  time domain CCK MRC module responsive to the MRC parameters and operative to apply the time offset and the phase offset to the CCK modulated signals in time domain to generate aligned signals, the aligned signals being combined to generate an adjusted signal transferred to the CCK module for demodulation;

a frequency domain MRC module responsive to said MRC parameters and operative to perform phase adjustment in the frequency domain on the synchronization module output to combine the subcarriers, the first and second received baseband signals including a preamble format of a packet of information having a short training sequence (STS), a long training sequence (LTS) and signal (SIG) for training receivers, said preamble format having a physical layer identification to allow data to be received through the physical layer of a networking layer for communication, wherein the receiver system is operative to combine the OFDM modulated signals on the basis of each subcarrier using varying MRC parameters optimized for each subcarrier.

2. A receiver system, as recited in claim 1, wherein the synchronization module is operative to compute the time offset d between peak locations of the first and second received baseband signals and is further operative to compute the phase offset φ for phase adjustment of the first and second CCK modulated signals.

3. A receiver system, as recited in claim 1, wherein the receiver system is operative to determine the appropriate modulation mode for decoding the first and second received baseband signals by estimating the modulation mode best suited for the first and second received baseband signals and the next data packet to be transmitted, the estimation of the modulation mode is based on the quality of the received sub-carriers, the receiver system operative to send to a transmitter the estimated modulation mode as the recommended modulation mode for the sub-carriers included in a sub-carrier modulated group.

4. A receiver system, as recited in claim 1, further including at least two cross correlators operative to distinguish between the CCK and OFDM modulated signals.

5. A method of receiving packets of information in a multi input multi output (MIMO) communications system comprising:

receiving a first received baseband signal, including subcarriers, from a first antenna;

receiving a second baseband signal, including subcarriers, from a second antenna, each of said first and second received baseband signals including a respective orthogonal frequency division multiplexing (OFDM) modulated signal and a respective time domain complementary code keying (CCK) modulated signal;

aligning the OFDM modulated signals in the time domain;

generating two aligned OFDM signals;

computing maximum ratio combining (MRC) parameters for the time domain CCK modulated signals included in the received baseband signals;

receiving MRC parameters and applying the time offset and the phase offset to the CCK modulated signals in time domain to generate aligned signals;

combining the aligned signals to generate an adjusted signal transferred to the CCK module for demodulation;

performing phase adjustment in the frequency domain on the synchronization module output to combine the subcarriers, wherein the receiver system is operative to combine the OFDM modulated signals on the basis of each subcarrier using varying MRC parameters optimized for each subcarrier.

* * * * *